United States Patent
Kubotani et al.

(10) Patent No.: US 7,890,057 B2
(45) Date of Patent: Feb. 15, 2011

(54) ROAD-VEHICLE COMMUNICATION SYSTEM, AND ROADSIDE APPARATUS, MOBILE APPARATUS WHICH ARE USED FOR THE SAME

(75) Inventors: Hiroyuki Kubotani, Yokohama (JP); Koji Arata, Yokohama (JP); Nobuhiro Fukuda, Yokohama (JP)

(73) Assignee: Panasonic Corporation, Osaka (JP)

( * ) Notice: Subject to any disclaimer, the term of this patent is extended or adjusted under 35 U.S.C. 154(b) by 461 days.

(21) Appl. No.: 10/957,943

(22) Filed: Oct. 4, 2004

(65) Prior Publication Data
US 2005/0083866 A1 Apr. 21, 2005

(30) Foreign Application Priority Data
Oct. 8, 2003 (JP) .............................. 2003-349268
Oct. 14, 2003 (JP) .............................. 2003-353455

(51) Int. Cl.
*H04B 5/00* (2006.01)
*H04B 7/00* (2006.01)
*H04W 4/00* (2009.01)

(52) U.S. Cl. .................... 455/41.2; 455/41.1; 455/41.3; 455/422.1; 370/310; 370/453; 370/352; 370/401

(58) Field of Classification Search ................ 370/310, 370/463, 352, 401, 453; 455/41, 422
See application file for complete search history.

(56) References Cited

U.S. PATENT DOCUMENTS

| | | | |
|---|---|---|---|
| 4,403,112 A | 9/1983 | Modaferi | |
| 5,181,247 A | 1/1993 | Holl | |
| 5,430,727 A | 7/1995 | Callon | |
| 6,115,615 A * | 9/2000 | Ota et al. ................. | 455/422.1 |
| 6,714,536 B1 * | 3/2004 | Dowling ..................... | 370/356 |
| 7,035,932 B1 * | 4/2006 | Dowling ..................... | 709/230 |
| 2002/0181498 A1 | 12/2002 | Hsu et al. | |

(Continued)

FOREIGN PATENT DOCUMENTS

CN 1297662 A 5/2001

(Continued)

OTHER PUBLICATIONS

European Search Report for EP 04 02 3562, dated Nov. 22, 2006.

(Continued)

*Primary Examiner*—Matthew Anderson
*Assistant Examiner*—Wen W Huang
(74) *Attorney, Agent, or Firm*—RatnerPrestia

(57) ABSTRACT

A roadside apparatus is connected to a roadside network and an in-vehicle apparatus which carries out wireless data transfer with the roadside apparatus, and it is equipped with a specifying unit for specifying an in-vehicle apparatus by associating an IP address which was assigned with respect to each in-vehicle apparatus, and an in-vehicle apparatus identifier other than an IP address. By this configuration, between the roadside apparatus and the in-vehicle apparatus, enabled is data communication which utilized an IP series communication protocol for specifying an in-vehicle apparatus by use of an IP address which was assigned with respect to each in-vehicle apparatus, and a non-IP series communication protocol for specifying an in-vehicle apparatus by use of LID.

11 Claims, 24 Drawing Sheets

U.S. PATENT DOCUMENTS

| | | | |
|---|---|---|---|
| 2004/0176128 A1* | 9/2004 | Grabelsky et al. | 455/553.1 |
| 2004/0218609 A1* | 11/2004 | Foster et al. | 370/401 |
| 2005/0014468 A1* | 1/2005 | Salokannel et al. | 455/41.2 |
| 2006/0203804 A1* | 9/2006 | Whitmore et al. | 370/352 |
| 2007/0064725 A1* | 3/2007 | Minami et al. | 370/463 |

FOREIGN PATENT DOCUMENTS

| | | |
|---|---|---|
| DE | 199 27 304 A | 6/1999 |
| EP | 2003-92576 A | 3/2003 |
| JP | 01-272299 A | 10/1989 |
| JP | 2003-354285 A | 12/2000 |
| JP | 2002-344381 A | 11/2002 |
| JP | 2003-092576 A | 3/2003 |
| WO | WO 97/26750 A | 7/1997 |
| WO | WO 99/22301 A | 5/1999 |
| WO | WO 00/59252 | 10/2000 |
| WO | WO 00/77621 A | 12/2000 |

OTHER PUBLICATIONS

European Search Report for Application No. EP 04 74 8300, dated Aug. 23, 2005.

Masashi Hiraiwa et al., Implementation and Evaluation of DSRC access network, IPSJ SIG Technical Report, May 23, 2003.

* cited by examiner

FIG. 5

| IN-VEHICLE APPARATUS MANAGEMENT NO. | LID | IP ADDRESS |
|---|---|---|
| 1 | 0x12121212 | 192.168.0.2 |
| 2 | 0x23232323 | 192.168.0.3 |
| 3 | 0x34343434 | 192.168.0.4 |
| 4 | 0x45454545 | 192.168.0.5 |

ROAD-VEHICLE COMMUNICATION SYSTEM, AND ROADSIDE APPARATUS, MOBILE APPARATUS WHICH ARE USED FOR THE SAME

FIELD OF THE INVENTION

This invention relates to a road-vehicle communication system which carries out communication between a roadside apparatus and an in-vehicle apparatus by means of electromagnetic waves, infrared rays and so on.

BACKGROUND OF THE INVENTION

In the past, for example, as shown in JP-A-2003-92576 publication, known was such a method that, in a road-vehicle communication system, a roadside apparatus generates an IP address (Internet Protocol Address) including an in-vehicle apparatus identifier which was obtained from an in-vehicle apparatus, and that IP address is notified to the in-vehicle apparatus to thereby assign the IP address to the in-vehicle apparatus, which is then connected to Internet.

According to this method, at the time of DSRC (Dedicated Short Range Communication) initial connection request from the in-vehicle apparatus, the roadside apparatus obtains the in-vehicle apparatus identifier LID (Link Identifier) which is defined in ARIB-STD-T75 (basis standard of DSRC communication technology in Japan. Hereinafter, inscribed as T75), and combines it with network prefix to generate an IP address, and at the time of DSRC initial connection response, overlaps the IP address with transmission data, and then, notifies it to the in-vehicle apparatus.

Therefore, according to this method, new communication sequence is not required for assigning an IP address, and communication by means of communication protocol for specifying an in-vehicle apparatus by use of LID and communication by means of communication protocol for specifying an in-vehicle apparatus by use of an IP address become possible.

However, in a conventional road-vehicle communication system, in case of the assumption that an application which was loaded in a roadside apparatus carries out data communication with an application which was loaded in an in-vehicle apparatus by use of a first communication protocol (e.g., IP series communication protocol for specifying an in-vehicle apparatus by use of an IP address), and a second communication protocol (e.g., non-IP series communication protocol for specifying an in-vehicle apparatus by use of LID), an application of a roadside apparatus does not handle an identifier which specifies an in-vehicle apparatus by the first communication protocol (e.g., IP address) and an identifier which specifies an in-vehicle apparatus by the second communication protocol in combination, and therefore, there was a problem that a roadside apparatus can not specify an arbitrary in-vehicle apparatus by use of both communication protocols.

Therefore, this means that, an application in which a number of 2 or more communication protocols are used in parallel generates a problem that it becomes more difficult to specify an arbitrary in-vehicle apparatus.

Also, on the occasion of assigning Ipv4 (Internet Protocol Version 4) to an in-vehicle apparatus, there is a necessity to carry out assignment of an IP address after data length was shortened to LID by use of a hash function etc. That is, in case of assigning, for example, an IP address with class B, to LID which is represented by 32 bits, 16 bits are of a host address, and therefore, there is a necessity to make LID 16 bits by use of the hash function. On that account, there was a problem that there is a possibility of giving an identical IP address to different vehicles erroneously, respectively.

SUMMARY OF THE INVENTION

The invention relates to a road-vehicle communication system in which a roadside apparatus can specify an arbitrary mobile apparatus with concomitant use of a plurality of communication protocols.

Also, the invention relates to a road-vehicle communication system which is available with concomitant use of an IP series communication protocol for specifying a mobile apparatus by an IP address which was assigned to the mobile apparatus, and a non-IP series communication protocol for specifying a mobile apparatus by use of LID.

Also, the invention relates to a road-vehicle communication system in which a roadside apparatus specifies an arbitrary mobile apparatus on a plurality of communication protocols, and according to need, a plurality of the communication protocols can be changed over and used.

Further, the invention relates to provide a road-vehicle communication system in which there occurs a no case that an identical IP address is not assigned to different vehicles.

A road-vehicle communication system has a roadside unit disposed in the vicinity of an area through which a mobile passes, for carrying out communication with the mobile without wires, a mobile unit loaded on the mobile, for carrying out communication with the roadside unit without wires, by use of any one of communication protocols including at least first and second communication protocols, and a specifying unit for specifying the mobile unit by associating first identifying information for identifying the mobile unit by the first communication protocol with second identifying information for identifying the mobile unit by the second communication protocol.

By this configuration, it is possible to carry out data communication between the roadside unit and the mobile unit with concomitant use of a plurality of communication protocols.

For example, between a roadside apparatus and a mobile apparatus, enabled is data communication which utilized, in parallel, the IP series communication protocol for specifying a mobile apparatus by use of an IP address which was assigned with respect to each mobile apparatus and the non-IP series communication protocol for specifying a mobile apparatus by use of LID, and also, since assignment of IP address and assignment of LID are carried out independently, it is possible to avoid such a conventional problem that an identical IP address is assigned to different vehicles. Therefore, it becomes possible to realize a road-vehicle communication system which can carry out data communication in accordance with a type of data which is exchanged, by use of a communication protocol which is suitable for it.

Also, in the road-vehicle communication system of the invention, the specifying unit has an associating unit for associating the first identifying information and the second identifying information which were disposed in the roadside unit.

By this configuration, the specifying unit of the roadside apparatus, which has the associating unit, can specify the mobile unit with concomitant use of a plurality of communication protocols.

Also, in the road-vehicle communication system of the invention, the associating unit receives the first identifying information and the second identifying information which were notified from the mobile unit, respectively, and stores these in association with each other.

By this configuration, for example, in a roadside apparatus, it is possible to know a corresponding relation of an IP address and LID which were assigned with respect to each mobile apparatus, of a mobile apparatus which exists in a communication area which is configured by itself, respectively, and therefore, it is possible to realize a road-vehicle communication system in which identifiable is the mobile apparatus which exists in the communication area which is configured by the roadside apparatus, by the IP series communication protocol for specifying by use of an IP address and the non-IP communication protocol for specifying by use of LID.

Also, in the road-vehicle communication system of the invention, the associating unit obtains the first identifying information and the second identifying information in the roadside unit, and stores these in association with each other.

By this configuration, for example, in a roadside apparatus, it is possible to associate an IP address, and LID, which were assigned with respect to each mobile apparatus, respectively, and therefore, it is possible to realize a road-vehicle communication system which had a function that the IP address and LID, which were assigned with respect to each mobile apparatus, can be associated respectively without any functional addition or any modification to a conventional mobile apparatus, in a roadside apparatus.

Also, in the road-vehicle communication system of the invention, the specifying unit has a notifying unit disposed in the mobile unit for notifying the first identifying information and the second identifying information to the roadside unit.

By this configuration, for example, it becomes possible to notify a corresponding relation of an IP address and LID to the roadside apparatus, and it is possible to realize a road-vehicle communication system which has a function for notifying an IP address and LID, which are identifying information with which a roadside apparatus specifies a mobile apparatus, in association with each other, respectively.

Also, in the road-vehicle communication system of the invention, the notifying unit notifies the first identifying information to the roadside unit, by use of the second communication protocol.

By this configuration, for example, it has an operation that a mobile apparatus can notify an IP address and LID, which were assigned with respect to each mobile apparatus, respectively to a roadside apparatus, by storing an IP address which was assigned with respect to each mobile apparatus in data which is transmitted to a roadside apparatus and transmitting it to the roadside apparatus by use of the non-IP series communication protocol for specifying a mobile apparatus by use of LID. Therefore, without tampering with a conventional roadside apparatus, it is possible to realize a road-vehicle communication system which had a notifying function in which it is possible to notify an IP address and LID, which were assigned with respect to each mobile apparatus, to a roadside apparatus.

Also, in the road-vehicle communication system of the invention, the notifying unit notifies the second identifying information to the roadside apparatus by use of the first communication protocol.

By this configuration, for example, a mobile apparatus can notify an IP address and LID, which were assigned with respect to each mobile apparatus, respectively to a roadside apparatus, by storing LID in data which is transmitted to a roadside apparatus and transmitting it to the roadside apparatus by use of the IP series communication protocol for specifying a mobile apparatus by use of an IP address. Therefore, without tampering with a conventional mobile apparatus, it is possible to realize a road-vehicle communication system which had a notifying function in which it is possible to notify an IP address and LID, which were assigned with respect to each mobile apparatus, to a roadside apparatus.

Further, in the road-vehicle communication system of the invention, the specifying unit has a communication protocol switching request issuing unit disposed on the roadside unit for issuing a switching request to the second communication protocol by the first communication protocol, to the mobile unit, a switching response receiving unit for receiving a switching response to the switching request by the second communication protocol from the mobile unit, an associating unit for associating the switching request which was issued by the switching request issuing unit and the switching response which was received by the switching response receiving unit, a switching request receiving unit disposed on the mobile unit for receiving a switching request to the second communication protocol by the first communication protocol, a communication protocol switching unit for switching a communication protocol which is used for the communication to the second communication protocol according to a switching request which was received by the switching request receiving unit, and a switching response transmitting unit for transmitting a switching response to the switching request by the second communication protocol.

By this configuration, it enables a roadside apparatus to specify an arbitrary mobile apparatus on a plurality of communication protocols, and switches and uses a plurality of the communication protocols according to need. Therefore, it becomes possible to realize a road-vehicle communication system which uses an appropriate communication protocol properly, according to a type of data which is exchanged in communication.

Also, in the road-vehicle communication system of the invention, the switching request includes a request identifier for identifying the switching request, and the switching response includes a response identifier which corresponds to the request identifier.

By this configuration, a roadside apparatus can know that a switching response, which was received from a mobile apparatus, corresponds to a switching request of which one of communication protocols that the roadside apparatus issued in the past. That is, it is possible to know which mobile apparatus the response comes from. Therefore, a roadside apparatus transmits data to a mobile apparatus as a source for sending a switching response, and thereby, it becomes possible to specify an identical mobile apparatus on a plural types of communication protocols and carry out data communication.

Also, in the road-vehicle communication system of the invention, the first communication protocol is a communication protocol for specifying the mobile unit by use of the first identifying information other than IP address, and the second communication protocol is a communication protocol for specifying the mobile unit by use of the second identifying information which is an IP address.

By this configuration, enabled is data communication between a roadside apparatus and a mobile apparatus, using a communication protocol specifying the mobile apparatus by use of an IP address. Also, assignment of an IP address to a mobile apparatus can be carried out completely independently from a communication protocol for specifying by use of an identifier other than an IP address, like LID, and therefore, it becomes possible to avoid a conventional problem that an identical IP address may be assigned to difference mobile apparatuses.

Further, in the road-vehicle communication system of the invention, the first communication protocol is a communication protocol for specifying the mobile unit by use of an IP address which is the first identifying information, and the second communication protocol is a communication protocol for specifying the mobile unit by use of the second identifying information other than an IP address.

By this configuration, enabled is data communication between a roadside apparatus and a mobile apparatus, using a communication protocol for specifying the mobile apparatus by use of a mobile apparatus identifier other than an IP address, like LID. Therefore, generated is an advantage that a roadside apparatus can select a communication protocol for specifying a mobile apparatus by a mobile apparatus identifier other than an IP address, according to a type of data which is transmitted and received in data communication between a roadside apparatus and a mobile apparatus.

BRIEF DESCRIPTION OF THE DRAWINGS

The invention, together with further advantages thereof, may best be understood by reference to the following description taken in conjunction with the accompanying drawings in which:

FIG. 5 is a view which shows a LID-IP address corresponding table, which is used in the road-vehicle communication system in the first exemplary embodiment of the invention and is managed in an associating section;

DETAILED DESCRIPTION OF THE EXEMPLARY EMBODIMENTS

Exemplary embodiments of the present invention will be hereinafter described with reference to the accompanying drawings.

1. First Exemplary Embodiment

Figure 1:
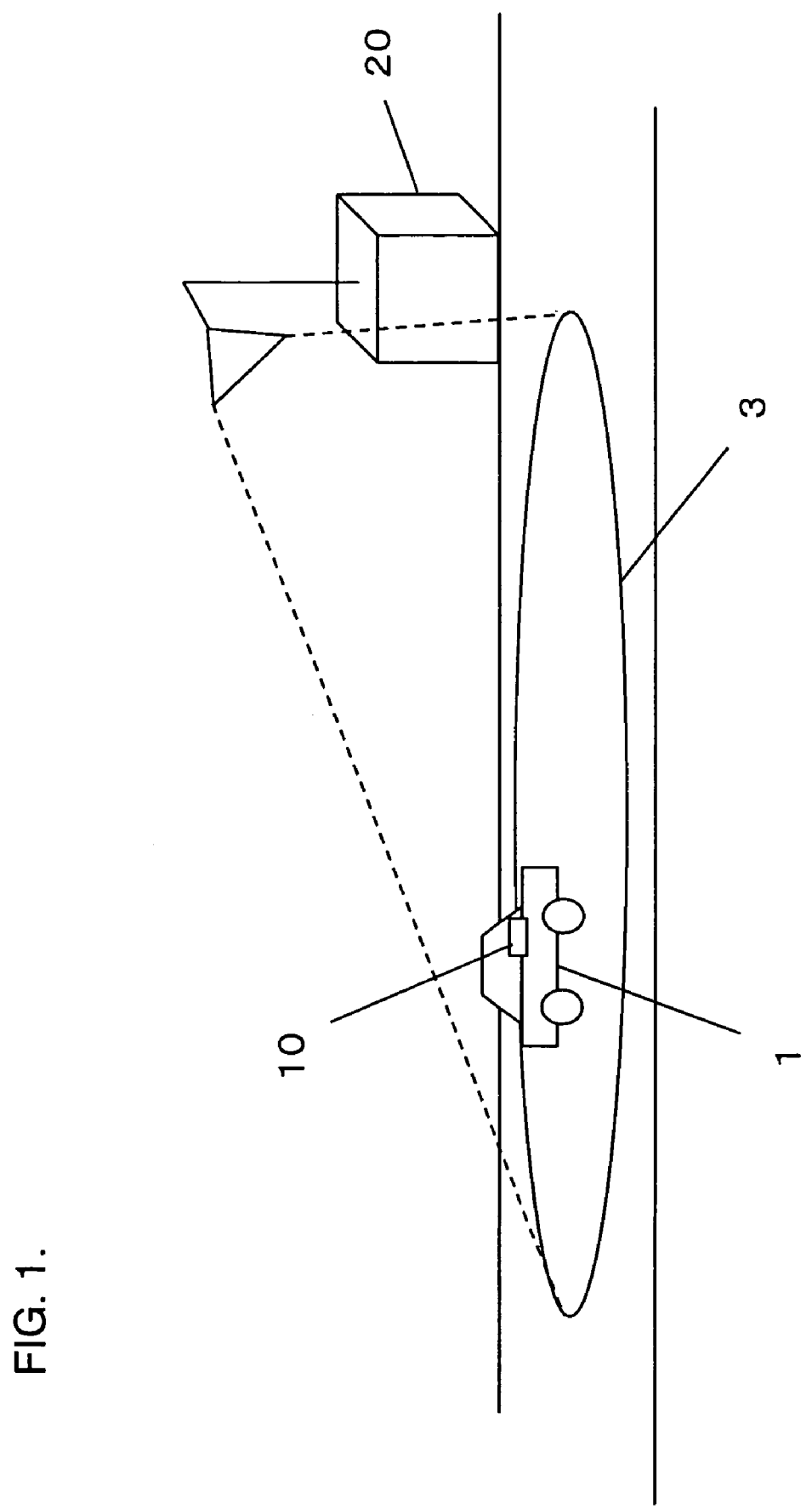
FIG. 1 is a conceptual diagram which shows a configuration of a road-vehicle communication system in a first exemplary embodiment of the invention.

FIG. 1 is a conceptual diagram which shows a configuration of a road-vehicle communication system in a first exemplary embodiment of the invention.

In FIG. 1, a vehicle 1 exists in a communication area 3 which is formed by a roadside system which includes a roadside apparatus 20 and a vehicle entering and leaving gate (not shown in the figure), and transmission and reception of data are carried out between an in-vehicle apparatus 10, as a mobile apparatus, which was loaded in the vehicle 1 and the roadside apparatus 20.

Figure 2:
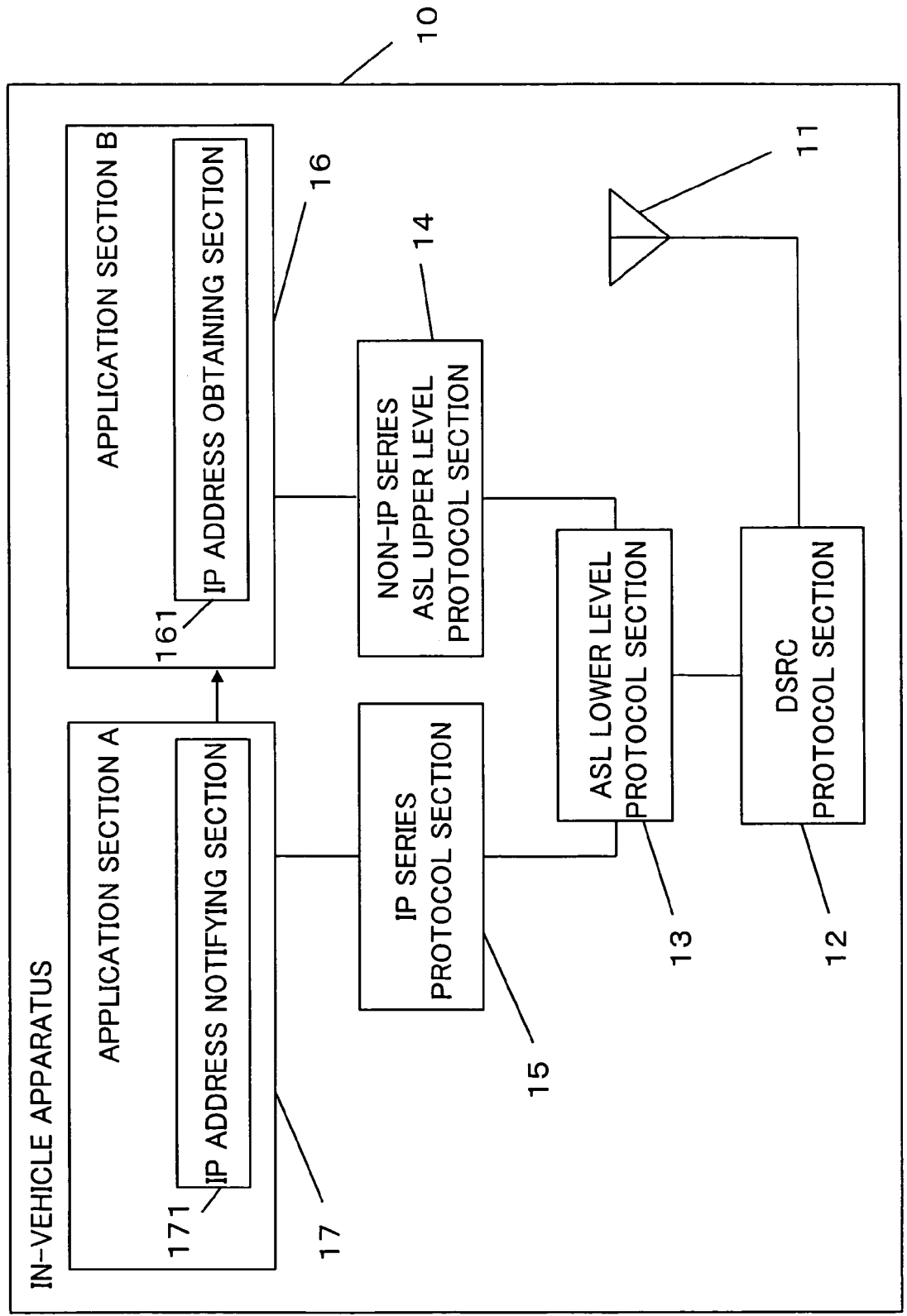
FIG. 2 is a block diagram of an in-vehicle apparatus which configures the road-vehicle communication system in the first exemplary embodiment of the invention.

The in-vehicle apparatus 10, which was loaded in the vehicle 1, has, as shown in FIG. 2, an antenna 11 for carrying out electromagnetic wave transmission to the roadside apparatus 20 which configures a roadside system, and electromagnetic wave reception from the roadside apparatus 20, a DSRC protocol section 12 which is defined by T75, for carrying out modulation/demodulation etc. of data, and an ASL lower level protocol section 13 which is defined by ARIB TR-T17 (hereinafter, referred to as T17) for carrying out various communication controls etc.

Further, the in-vehicle apparatus 10 has a non-IP series ASL upper level protocol section 14 which is defined in T17, for carrying out controls etc. regarding coordination with an application, an IP series protocol section 15 for realizing IP series communication on DSRC protocol, an application section B 16 which operates on the non-IP series ASL upper level protocol section 14, and an application section A 17 which operates on the IP series protocol section 15.

And, the application section A 17 has an IP address notifying section 171 for notifying an IP address, which was assigned to the in-vehicle apparatus 10, to the application section B 16, and also, the application section B 16 has an IP address obtaining section 161 for receiving an IP address from the application section A 17, and transmitting the IP address to the roadside apparatus 20, by use of the non-IP series ASL upper level protocol section 14.

Figure 3:
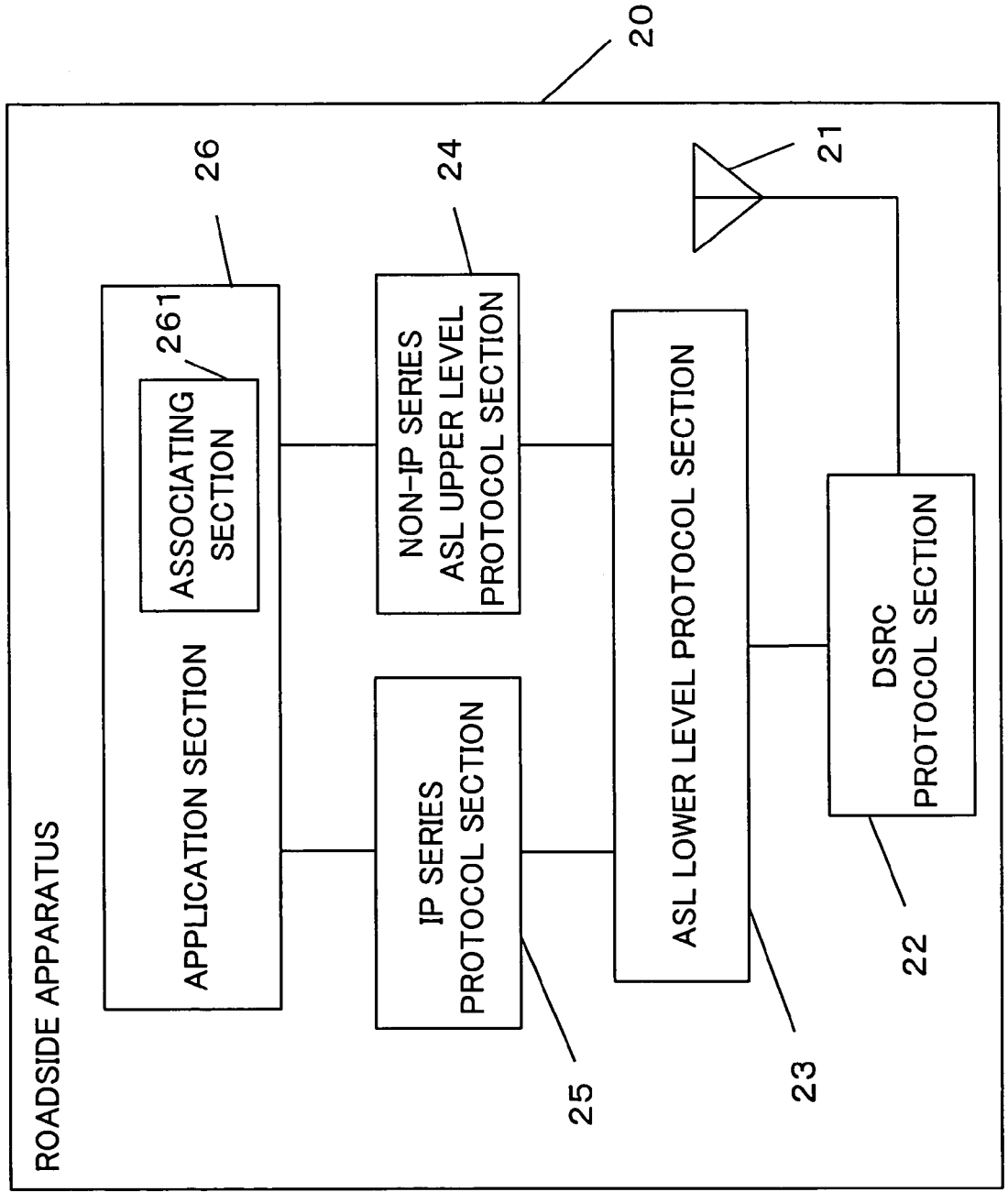
FIG. 3 is a block diagram of a roadside apparatus which configures the road-vehicle communication system in the first exemplary embodiment of the invention.

Also, the roadside apparatus 20, which configures a roadside system, is connected to a roadside network which is not shown in the figure, and has, as shown in FIG. 3, an antenna 21 for carrying out electromagnetic wave transmission to the in-vehicle apparatus 10 and electromagnetic wave reception from the in-vehicle apparatus 10, a DSRC protocol section 22 which is defined in T75 for carrying out modulation/demodulation etc. of data, and an ASL lower level protocol section 23 which is defined in T17 for carrying out various communication controls etc.

Further, the roadside apparatus 20 has a non-IP series ASL upper level protocol section 24 which is defined in T17 for carrying out controls etc. regarding coordination with an application, an IP series protocol section 25 for realizing IP series communication on DSRC protocol, and an application section 26 which operates on the non-IP series ASL upper level protocol section 24 and the IP series protocol section 25.

And, the application section 26 has an associating section for associating LID of the in-vehicle apparatus 10 and an IP address of the in-vehicle apparatus 10 to store the same.

Next, with regard to the road-vehicle communication system in the first exemplary embodiment of the invention, its operation will be described.

Firstly, in the in-vehicle apparatus 10, the DSRC protocol section 12 notifies LID to the roadside apparatus 20 at the time of DSRC initial connection request. In the roadside apparatus 20, the IP series protocol section 25 generates a new IP address, according to need, and associates it with LID which was obtained from the in-vehicle apparatus 10 to store the same, and notifies the generated IP address to the in-vehicle apparatus 10 through the ASL lower level protocol section 23 and the DSRC protocol section 22, and in the in-vehicle apparatus 10, the IP series protocol section 15 stores it for the purpose of conversion with LID of itself.

Figure 4:
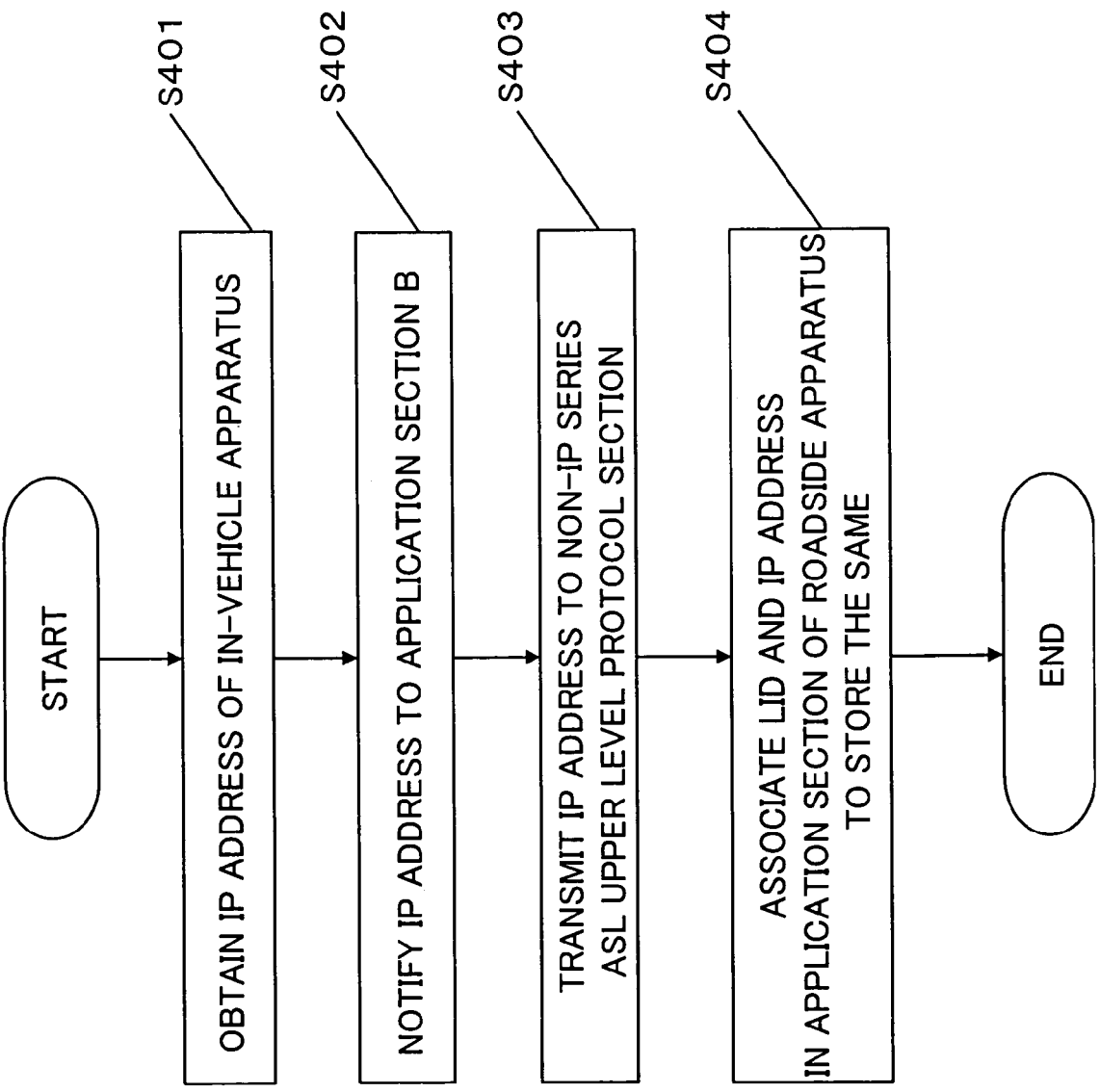
FIG. 4 is a flow chart which shows an operation of the road-vehicle communication system in the first exemplary embodiment of the invention.

That is, as shown in a flow chart of FIG. 4, as described above, when the IP series protocol section 15 of the in-vehicle apparatus 10 obtains an IP address which was assigned to the in-vehicle apparatus 10, from the IP series protocol section 25 of the roadside apparatus 20, through the DSRC protocol section 12 (step S401), the IP address notifying section 171 in the application section A 17 of the in-vehicle apparatus 10 notifies the IP address which was obtained by the IP series protocol section 15, to the application section B 16 (step S402).

The IP address obtaining section 161 of the application section B 16 transmits the obtained IP address to the roadside apparatus 20 through the non-IP series ASL upper level protocol section 14, as transmission data (step S403).

And, in the application section 26 of the roadside apparatus 20, the IP address which was obtained from the in-vehicle apparatus 10 is obtained through the non-IP series ASL upper level protocol section 24, and in the associating section 261 of the application section 26, it is associated with LID which was obtained from the non-IP series ASL upper level protocol section 24, and these are stored together, or separately (step S404).

That is, as shown in FIG. 5, the associating section 261 associates LID and an IP address with respect to each management No. of the in-vehicle apparatus 10, to store them, respectively.

In FIG. 5, LID (0x34343434) of the in-vehicle apparatus 10 with in-vehicle apparatus management No. 3 is associated with an IP address (192.168.0.4) and stored.

Therefore, hereinafter, in the roadside apparatus 20, in case of carrying out data communication with the in-vehicle apparatus 10, an IP address of the in-vehicle apparatus 10 is inquired to the associating section 261 according to a communication protocol which is utilized, in each case, and thereby, it becomes possible to specify the in-vehicle apparatus 10 in a plurality of communication protocols.

Figure 6:
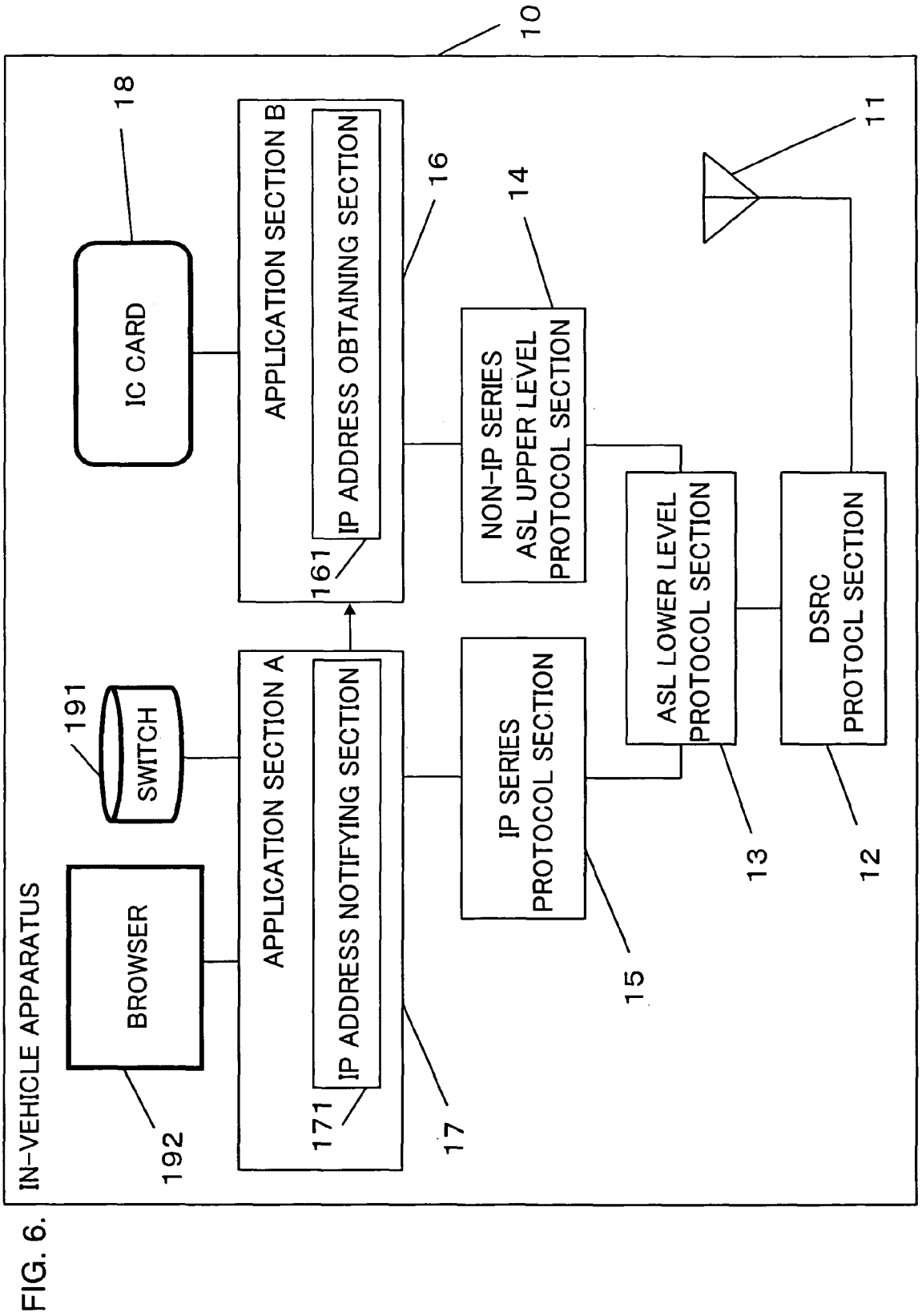
FIG. 6 is a schematic block diagram of an in-vehicle apparatus in case that the road-vehicle communication system in the first exemplary embodiment of the invention was used for IC card payment processing.

For example, as shown in FIG. 6, if a card reader, which can read and write an IC card 18 having a credit function as defined in ISO 7816 etc., is connected to the application section B 16, and a confirmation switch 191 for accepting an input from a user, and a monitor which is activated by a browser 192 having an application for browsing web pages and a screen for visually displaying information, etc. are connected to the application section A 17, it becomes possible to carry out transmission and reception of information which is displayed on the browser 192 by the IP series communication, and to carry out transmission and reception of IC card control commands by the non-IP series communication, and it becomes possible to easily carry out payment processing by use of an IC card.

Figure 7:
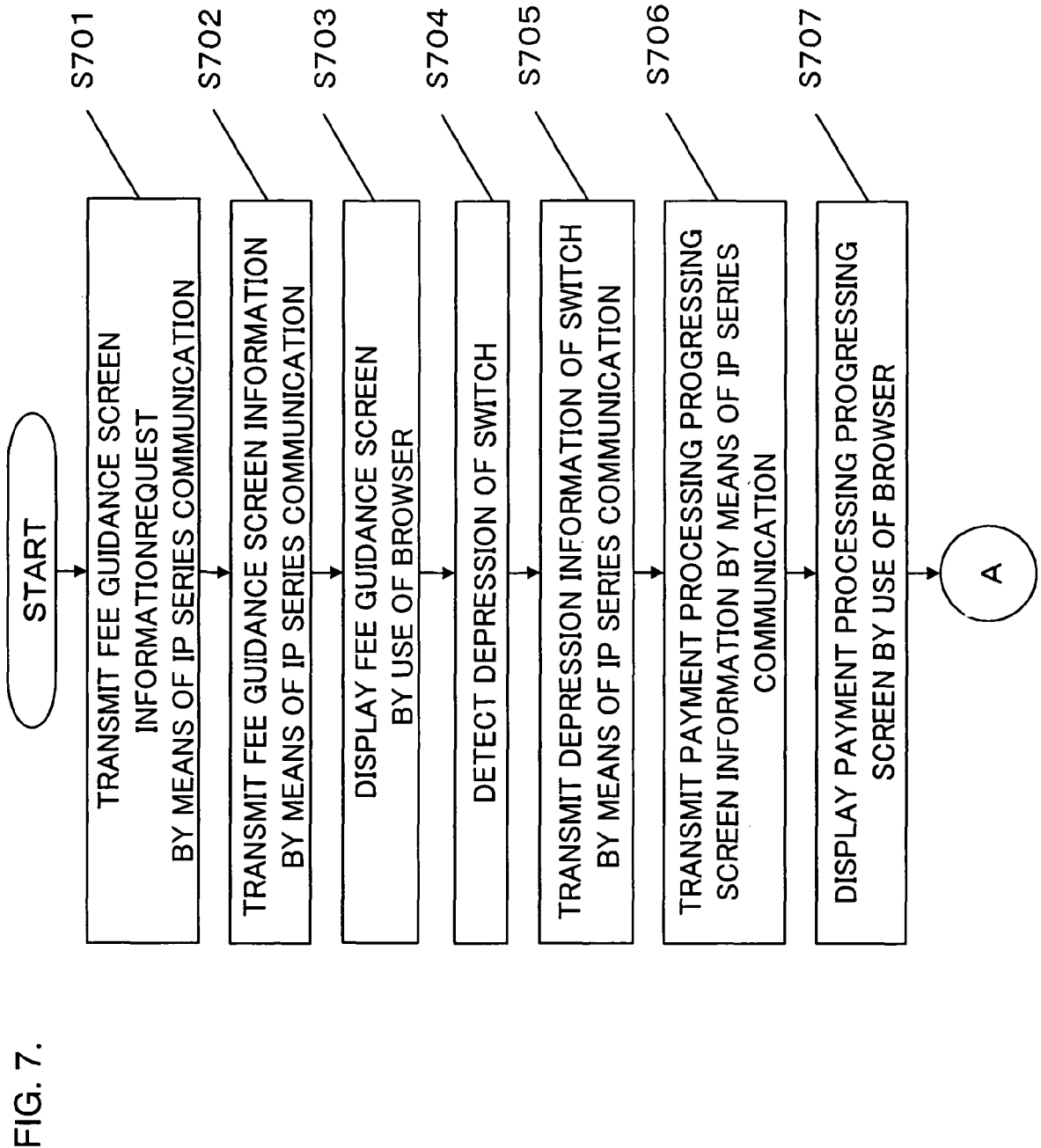
FIG. 7 is a first flow chart which shows an operation in case that the road-vehicle communication system in the first exemplary embodiment of the invention was used for IC card payment processing.
Figure 8:
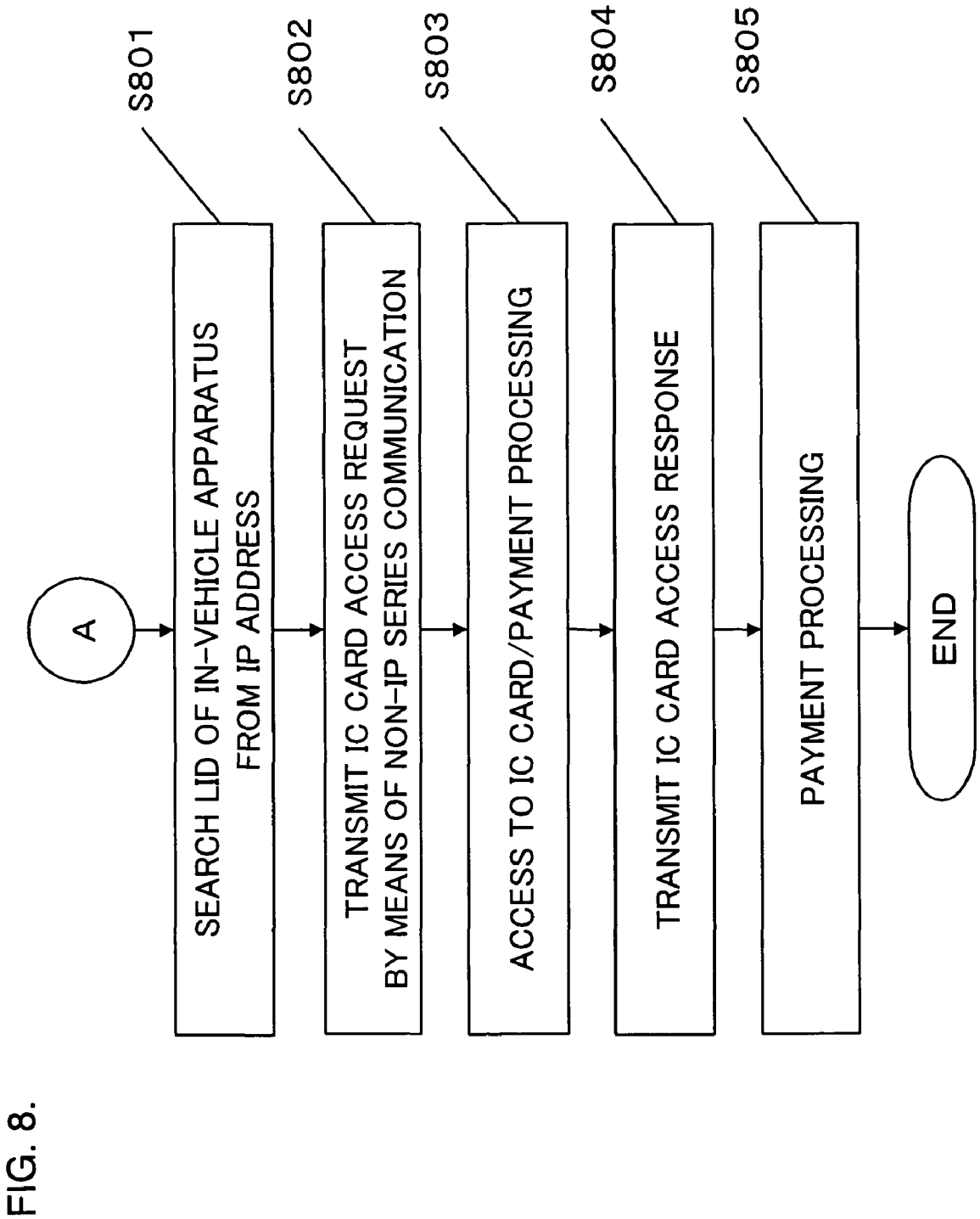
FIG. 8 is a second flow chart which shows an operation in case that the road-vehicle communication system in the first exemplary embodiment of the invention was used for IC card payment processing.

FIGS. 7 and 8 are flow charts which show operations in case of carrying out such IC card payment processing, and hereinafter, on the basis of this, the operation will be described.

When the application section A 17 of the in-vehicle apparatus 10 transmits a request of fee guidance screen information by use of IP series communication to the application section 26 of the roadside apparatus 20 (step S701), the application section 26 of the roadside apparatus 20 transmits fee guidance screen information by use of IP series communication, to the application section A 17 of the in-vehicle apparatus 10 (step S702).

The application section A 17 of the in-vehicle apparatus 10 displays the fee guidance screen by use of the browser 192, and waits for depression of the switch 191 by a user for the purpose of confirmation of fee payment approval (step S703).

When the application section A 17 of the in-vehicle apparatus 10 detects depression of the switch 191 (step S704), the application section A 17 of the in-vehicle apparatus 10 transmits depression information of the switch 191 by use of the IP series communication, to the application section 26 of the roadside apparatus 20 (step S705).

After that, the application section 26 of the roadside apparatus 20 transmits screen information which is currently in payment processing by use of the IP series communication, to the application section A 17 of the in-vehicle apparatus 10 (step S706), and the application section A 17 of the in-vehicle apparatus 10 displays a screen which is currently in payment processing, by use of the browser 192 (step S707).

And, in this state, the associating section 261 of the roadside apparatus 20 searches LID of the in-vehicle apparatus 10 from an IP address of the in-vehicle apparatus 10 (step S801).

When LID is searched, the application section 26 of the roadside apparatus 20 transmits an access request of the IC card 18 by use of the non-IP communication, to the application section B 16 of the in-vehicle apparatus 10 (step S802).

After that, the application section B 16 of the in-vehicle apparatus 10 accesses to the IC card 18, and carries out predetermined payment processing (step S803).

And, an access response of the IC card 18 is transmitted by use of the non-IP series communication, to the application section 26 of the roadside apparatus 20 (step S804).

As a result of that, in the application section 26 of the roadside apparatus 20, the predetermined payment processing is carried out (step S805), and IC card payment processing is finished.

In this manner, according to this exemplary embodiment, by using both of the IP series communication and the non-IP series communication, it is possible to carry out, for example, IC card payment processing.

2. Second Exemplary Embodiment

A conceptual diagram of a road-vehicle communication system in a second exemplary embodiment of the invention, and a block diagram of a roadside apparatus 20 are configured in the same manner as in the first exemplary embodiment shown in FIGS. 1 and 3, and therefore, detailed explanation thereof will be omitted here.

Figure 9:
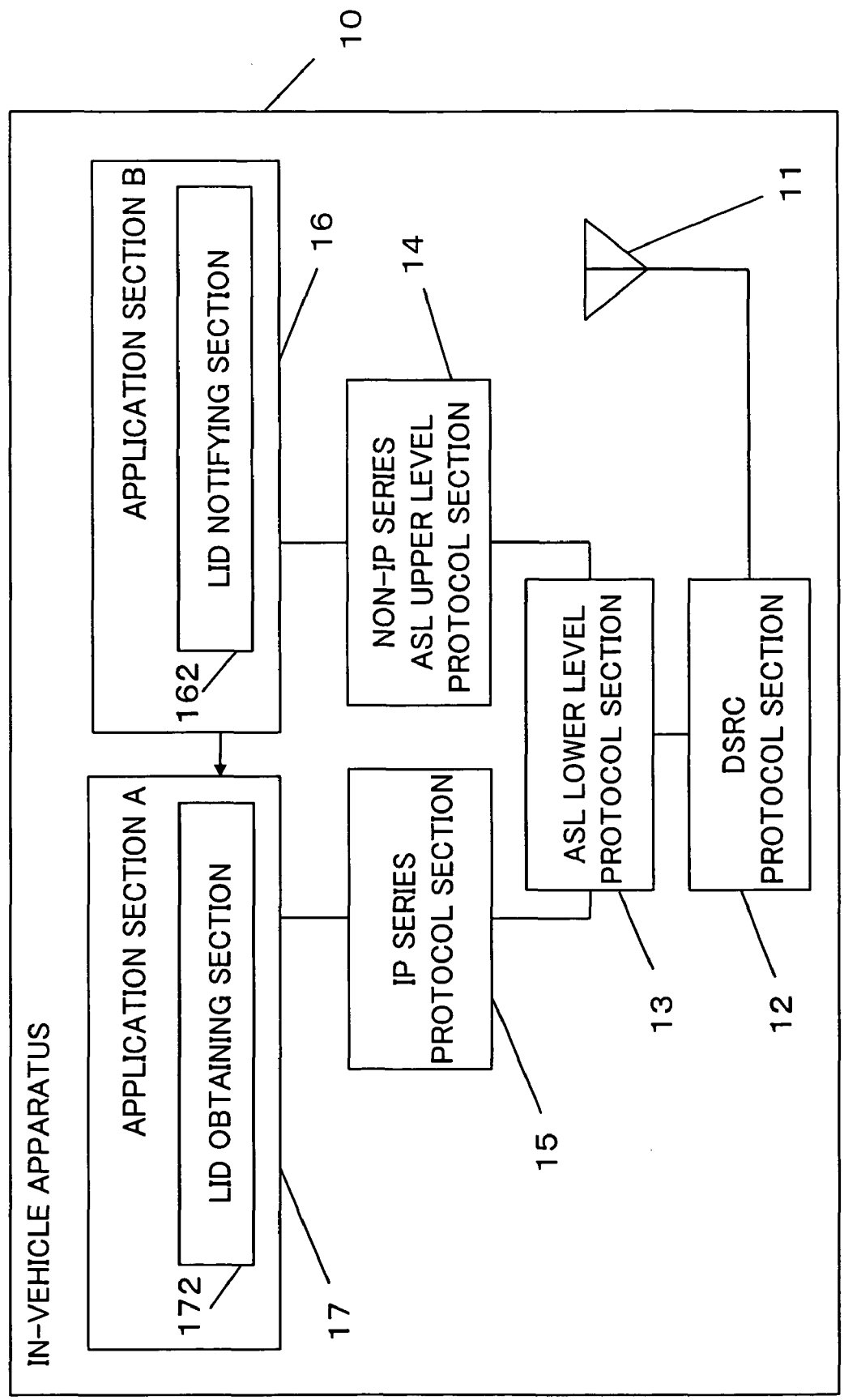
FIG. 9 is a block diagram of an in-vehicle apparatus which configures a road-vehicle communication system in a second exemplary embodiment of the invention.

FIG. 9 is a block diagram which shows an in-vehicle apparatus 10 in the second exemplary embodiment of the invention, and identical numbers are given to identical sections to those of the first exemplary embodiment shown in FIG. 2, and detailed explanation thereof will be omitted there.

A different point of the second exemplary embodiment from the first exemplary embodiment is a point that the application section A 17, which configures the in-vehicle apparatus 10, has a LID obtaining section 172 which receives LID from the application section B 16 and transmits LID to the roadside apparatus 20 by use of the IP series protocol section 15, and also, the application section B 16 has a LID notifying section 162 for notifying LID to the application section A 17.

Figure 10:
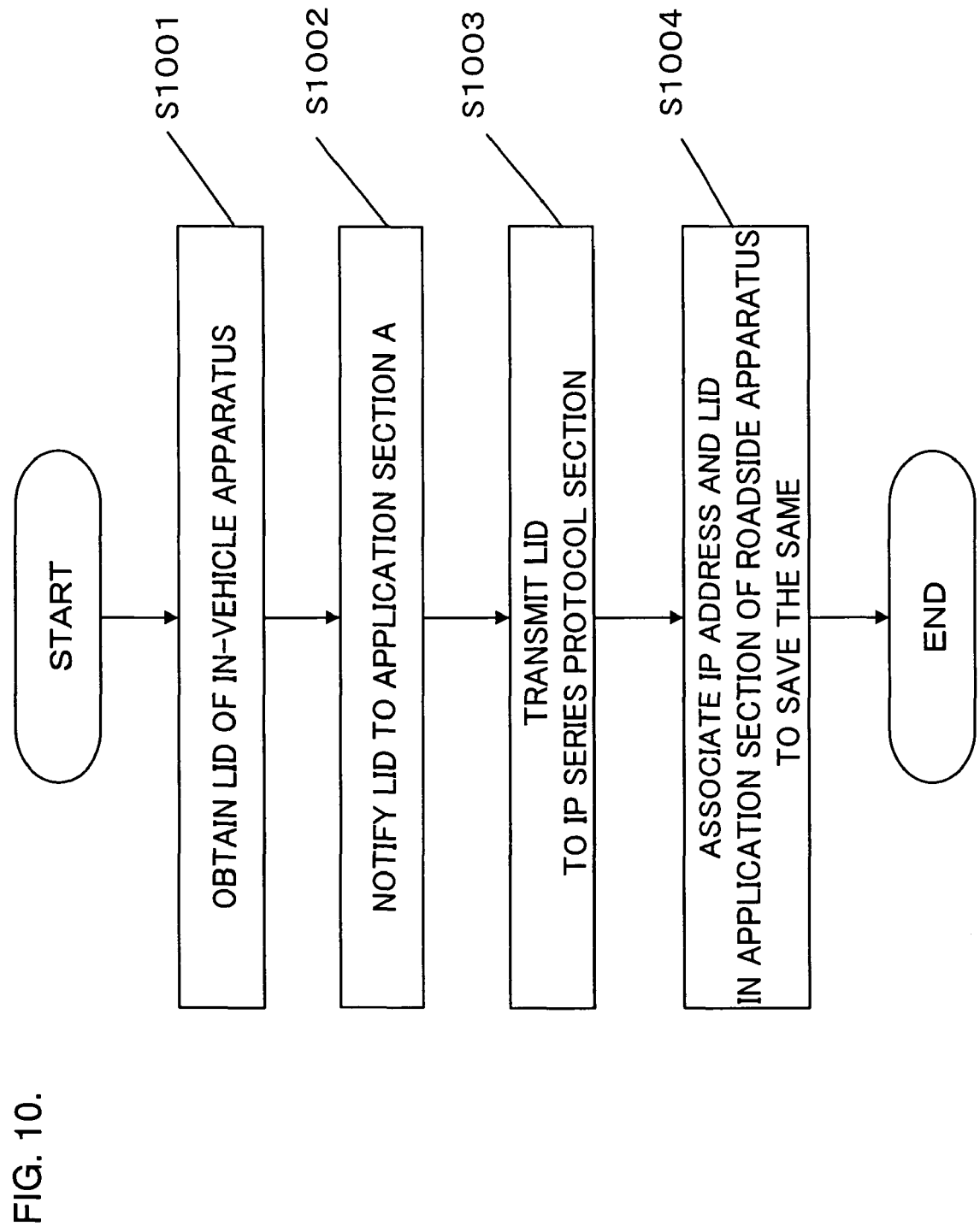
FIG. 10 is a flow chart which shows an operation of the road-vehicle communication system in the second exemplary embodiment of the invention.

Next, with regard to the road-vehicle communication system in the second exemplary embodiment of the invention, its operation will be described by use of a flow chart of FIG. 10.

The LID notifying section 162, which configures the application section B 16 of the in-vehicle apparatus 10, obtains LID of the in-vehicle apparatus 10 from the non-IP series ASL upper level protocol section 14 (step S1001), and notifies the obtained LID to the application section A 17 (step S1002).

The LID obtaining section 172 of the application section A 17 transmits the obtained LID to the IP series protocol section 15, as transmission data to the roadside apparatus 20 (step S1003).

In the application section 26 of the roadside apparatus 20, LID, which was obtained from the in-vehicle apparatus 10, is obtained through the IP series protocol section 25, and in the associating section 261 of the application section 26, it is stored together with LID, or separately in association with an IP address which was obtained from the IP series protocol section 25 (step S1004).

Therefore, hereinafter, in the roadside apparatus 20, on the occasion of carrying out data communication with the in-vehicle apparatus 10, it becomes possible to specify an in-vehicle apparatus in a plurality of communication protocols, by carrying out an inquiry to the associating section 261 according to a communication protocol which is utilized.

Figure 11:
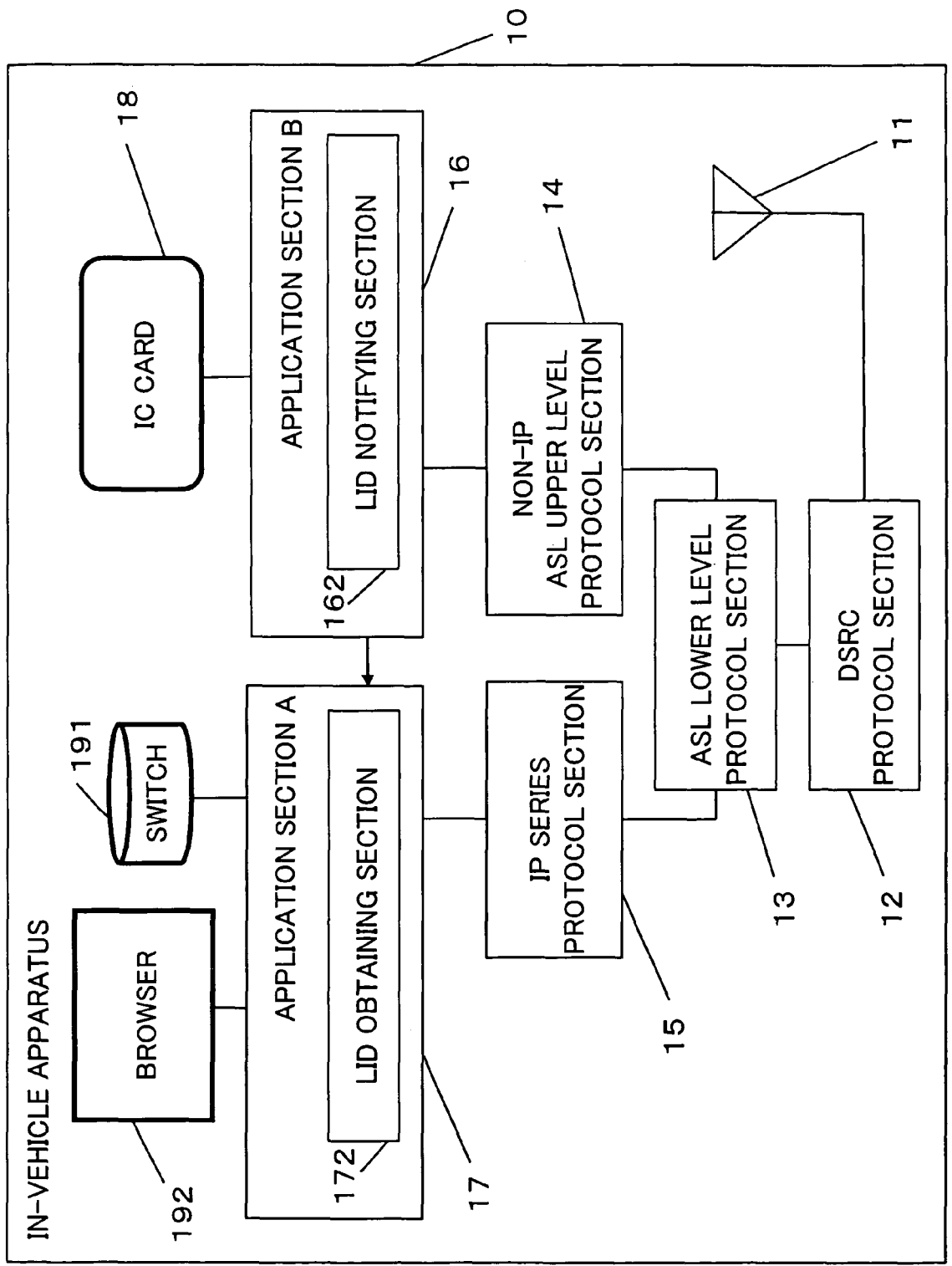
FIG. 11 is a schematic block diagram of an in-vehicle apparatus in case that the road-vehicle communication system in the second exemplary embodiment of the invention was used for IC card payment processing.

Therefore, for example, as shown in FIG. 11, if a card reader, which can read and write the IC card 18 having a credit function as defined in ISO 7816 etc., is connected to the application section B 16, the confirmation switch 191 for accepting an input from a user, and a monitor which is activated by the browser 192 having an application for browsing web pages and a screen for visually displaying information, etc. are connected to the application section A 17, and transmission and reception of information which is displayed on the browser 192 is carried out by the IP series communication, and transmission and reception of IC card control commands is carried out by the non-IP series communication, it becomes possible to easily carry out payment processing by use of an IC card.

3. Third Exemplary Embodiment

A conceptual diagram of a road-vehicle communication system in a third exemplary embodiment of the invention is configured as shown in FIG. 1, in the same manner as in the first and second exemplary embodiments.

Figure 12:
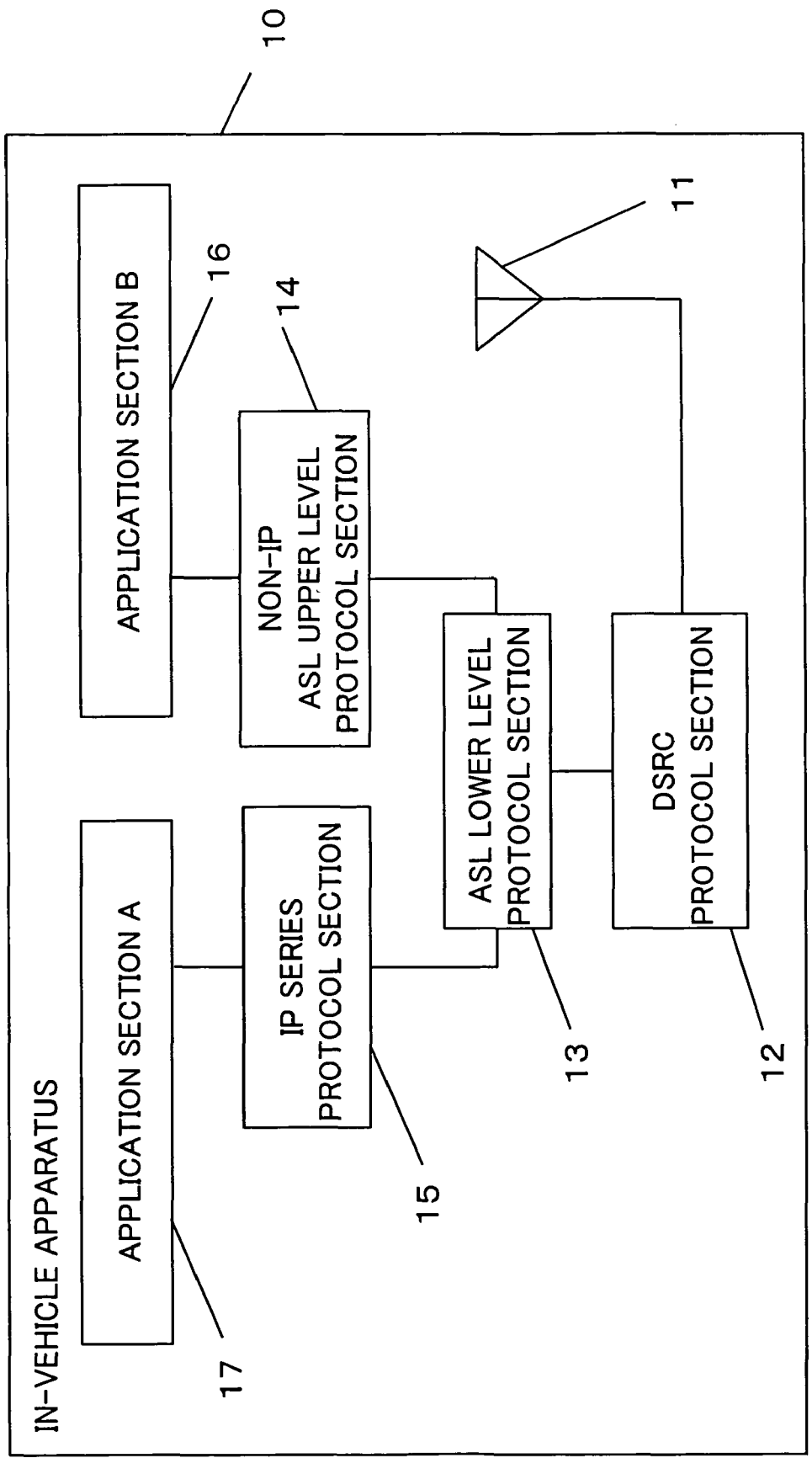
FIG. 12 is a block diagram of an in-vehicle apparatus which configures a road-vehicle communication system in a third exemplary embodiment of the invention.
Figure 13:
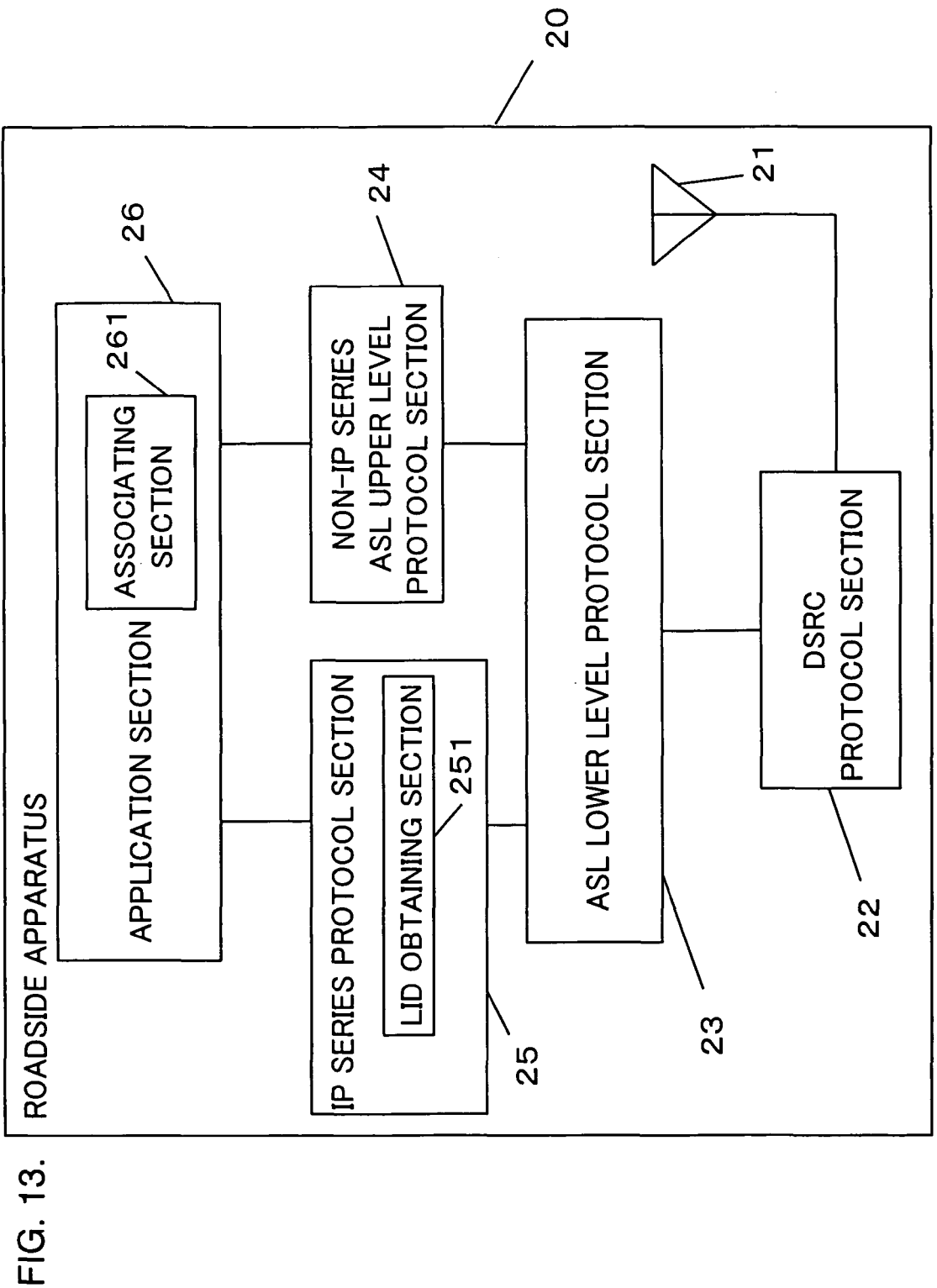
FIG. 13 is a block diagram of a roadside apparatus which configures the road-vehicle communication system in the third exemplary embodiment of the invention.

And, the in-vehicle apparatus 10 and the roadside apparatus 20 are configured as shown in FIGS. 12 and 13, respectively, and in FIGS. 12, 13, the same numbers given in FIGS. 2, 3, and 9 indicate the same things as those described in the previously explained first and second exemplary embodiments, and therefore, detailed explanation thereof will be omitted here, and only different points will be described.

That is, a different point of the third exemplary embodiment from the first and second exemplary embodiments is firstly that the application section A 16, and the application section B 17, which configure the in-vehicle apparatus 10, do not have the notifying sections 171 and 162, and the obtaining sections 161 and 172, of an IP address and LID.

Further, a different point of the third exemplary embodiment from the first and second exemplary embodiments is that the IP series protocol section 25, which configures the roadside apparatus 20, a LID obtaining section 251 for taking out LID of the in-vehicle apparatus 10 from data which was transmitted from the in-vehicle apparatus 10 and for carrying out notification of LID to the application section 26, and also, the application section 26 has an associating section 261 for associating LID, which was notified through the LID obtaining section 251, with an IP address which was obtained by the IP series protocol section 25, to store the same.

Figure 14:
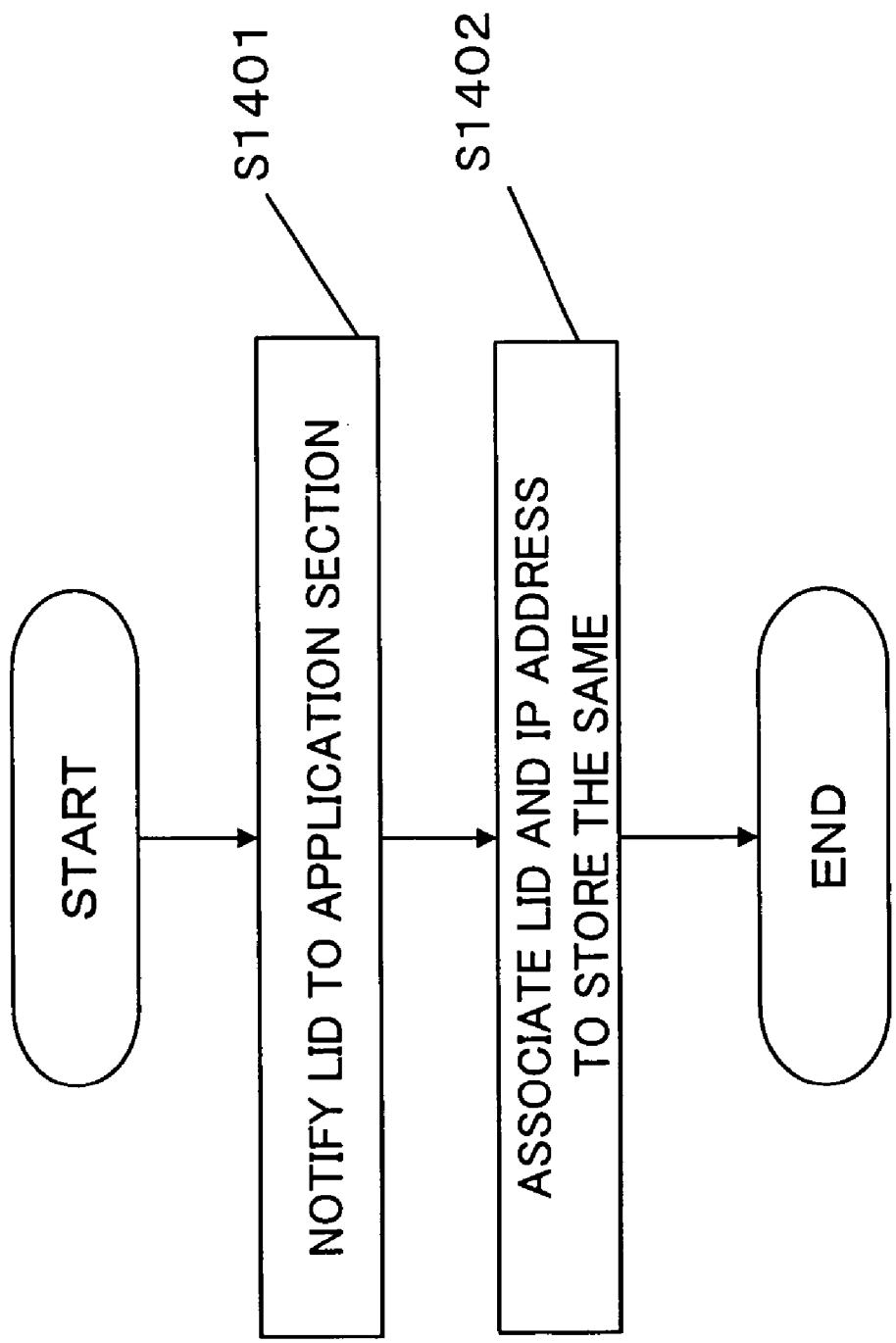
FIG. 14 is a flow chart which shows an operation of the road-vehicle communication system in the third exemplary embodiment of the invention.

Next, with regard to the road-vehicle communication system in the third exemplary embodiment of the invention, its operation will be described by use of a flow chart of FIG. 14.

When the in-vehicle apparatus 10 transmits LID to the roadside apparatus 20, the roadside apparatus 20 receives LID of the in-vehicle apparatus 10 by the LID obtaining section 251 which exists in an inside of the IP series protocol section 25, and notifies it to the application section 26 (step S1401).

When LID of the in-vehicle apparatus 10 is notified to the application section 26, the associating section 261 associates an IP address which was obtained from the IP series protocol section 25 and LID which was obtained from the LID obtaining section 251, respectively to store the same (step S1402).

Therefore, hereinafter, in the roadside apparatus 20, on the occasion of carrying out data communication with the in-vehicle apparatus 10, it becomes possible to specify an in-vehicle apparatus even in a plurality of communication protocols, by carrying out an inquiry about the IP address of the in-vehicle apparatus 10 to the associating section 261 according to a communication protocol which is utilized.

Figure 15:
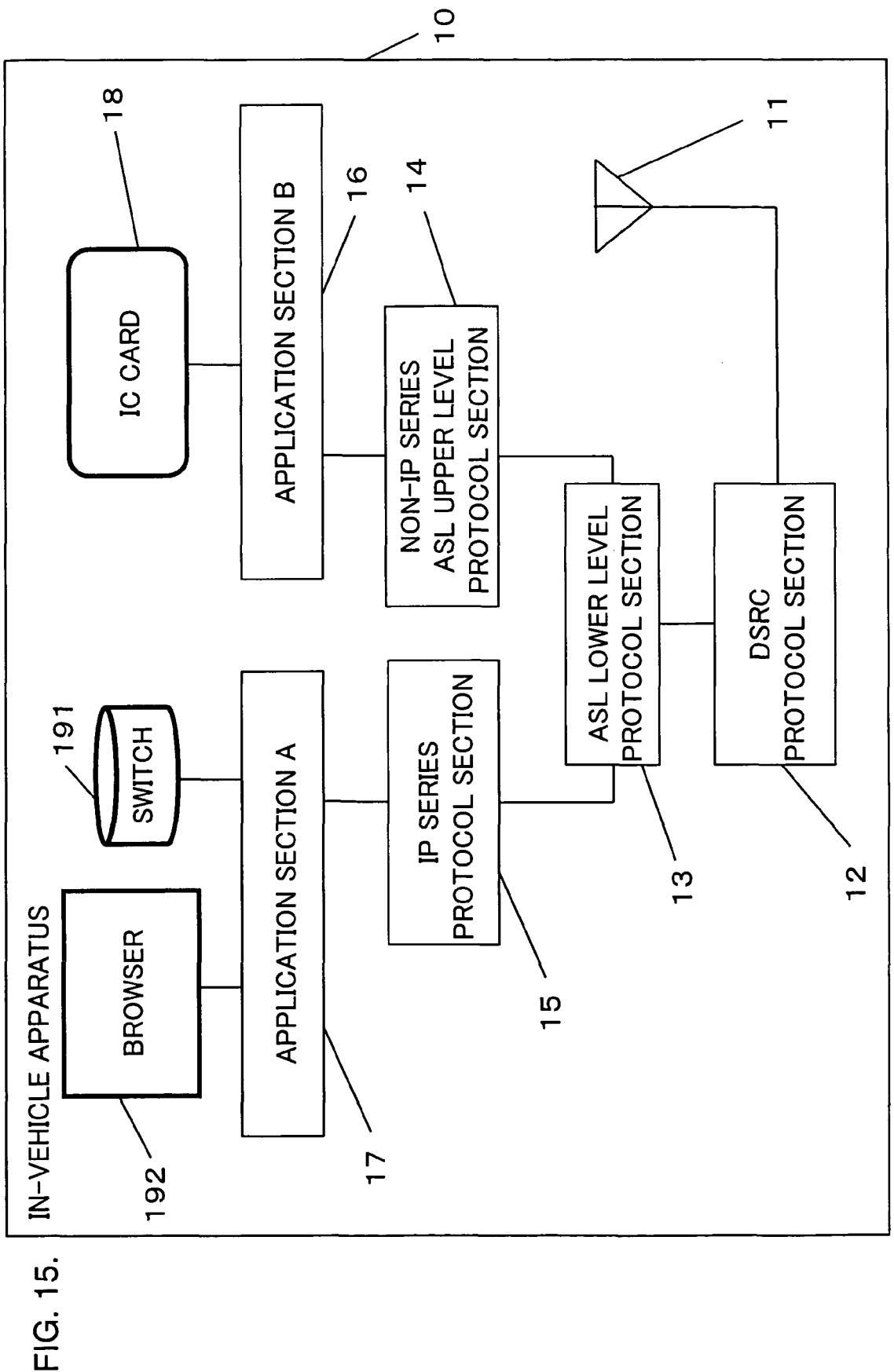
FIG. 15 is a schematic block diagram of an in-vehicle apparatus in case that the road-vehicle communication system in the third exemplary embodiment of the invention was used for IC card payment processing.

Therefore, for example, as shown in FIG. 15, if a card reader, which can read and write the IC card 18 having a credit function as defined in ISO 7816 etc., is connected to the application section B 16, the confirmation switch 191 for accepting an input from a user, and a monitor which is activated by the browser 192 having an application for browsing web pages and a screen for visually displaying information, etc. are connected to the application section A 17, transmission and reception of information which is displayed on the browser 192 is carried out by the IP series communication, and transmission and reception of IC card control commands is carried out by the non-IP series communication, it becomes possible to easily carry out payment processing by use of an IC card, in the same manner as in the exemplary embodiment shown in FIGS. 6 and 11.

Meanwhile, in FIGS. 2, 6, 9, 11 and 12, each of the application section A 17, the IP series protocol section 15, the application section B 16, the non-IP series ASL upper level protocol section 14, and the ASL lower level protocol section 13 is disposed in the same in-vehicle apparatus 10, but it may be all right even if it is configured in such a manner that at least one or a plurality of these things are disposed in an apparatus which is outside the in-vehicle apparatus 10, and can communicate with the in-vehicle apparatus 10 with wires or without wires.

Also, in FIGS. 3 and 13, each of the application section 26, the IP series protocol section 25, the non-IP series ASL upper level protocol section 24, and the ASL lower level protocol section 23 is disposed in the same roadside apparatus 20, but it may be all right even if at least one of or a plurality of these things are disposed in an apparatus which is outside the roadside apparatus 20, and can communicate with the roadside apparatus 20 with wires or without wires.

Also, in FIGS. 2, 6, 9, 11 and 12, it may be all right even if the application section A 17 and the application section B 16 are identical.

As above, the first through third exemplary embodiments of the invention is a thing which has a roadside apparatus, and an in-vehicle apparatus for carrying out wireless data communication with the roadside apparatus, and in which the roadside apparatus has an associating unit for associating an IP address which was assigned with respect to each in-vehicle apparatus, and an in-vehicle apparatus identifier other than an IP address, and by this configuration, between the roadside apparatus and the in-vehicle apparatus, enabled is data communication which utilized, for example, an IP series communication protocol for specifying an in-vehicle apparatus by use of an IP address which was assigned with respect to each in-vehicle apparatus and a non-IP series communication protocol for specifying an in-vehicle apparatus by use of LID, in parallel, and also, assignment of an IP address and assignment of LID are carried out independently, and therefore, it is possible to avoid such a conventional problem that an identical IP address is assigned to different vehicles.

4. Fourth Exemplary Embodiment

A conceptual diagram of a road-vehicle communication system in a fourth exemplary embodiment of the invention is configured as shown in FIG. 1, in the same manner as in the previous exemplary embodiments.

Figure 16:
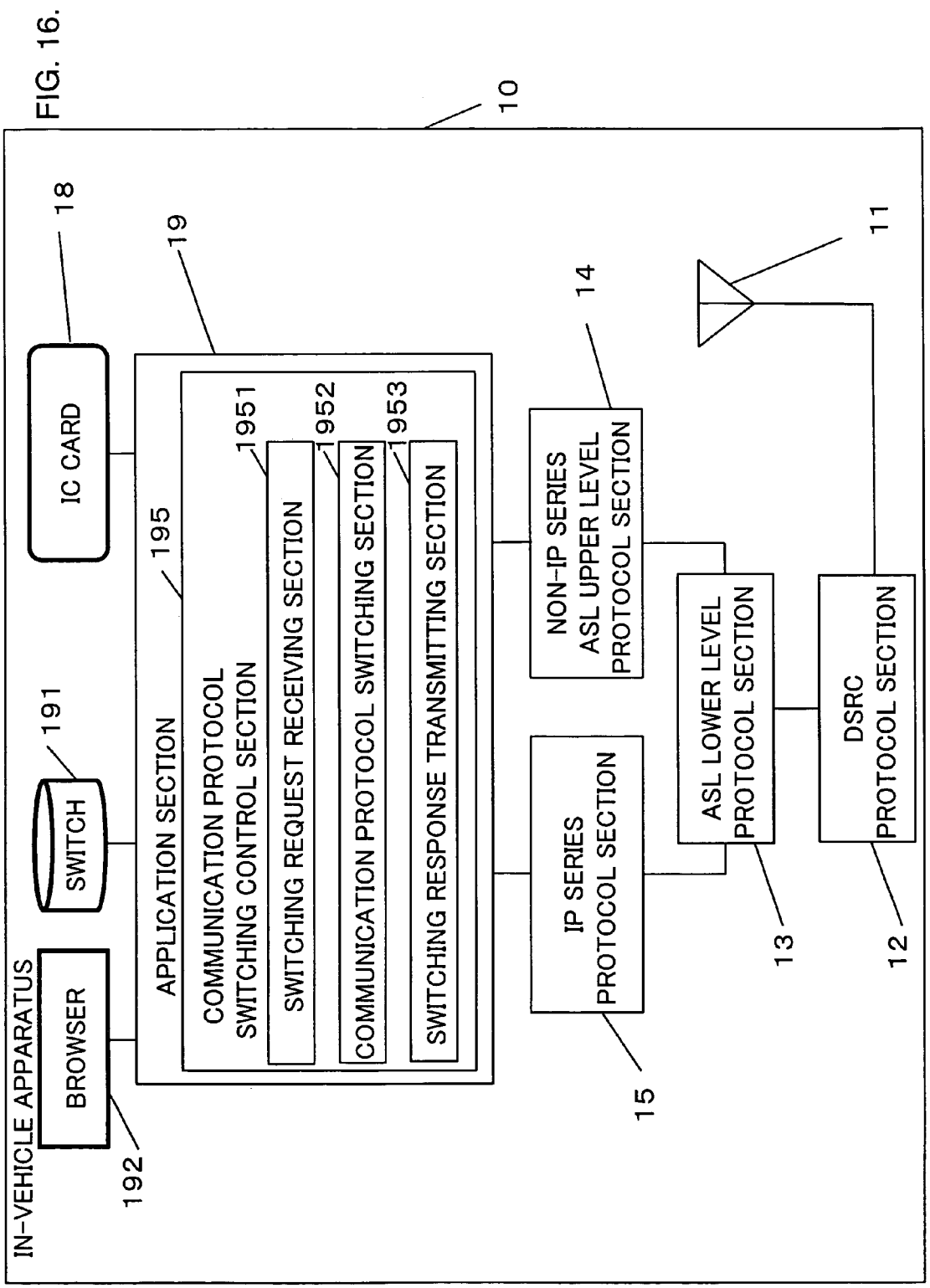
FIG. 16 is a block diagram of an in-vehicle apparatus which configures a road-vehicle communication system in a fourth exemplary embodiment of the invention.

FIG. 16 is a block diagram of the in-vehicle apparatus 10 which was loaded on the vehicle 1 of the road-vehicle communication system in the fourth exemplary embodiment.

In FIG. 16, same numbers are given to the same constituent elements as in the first through third exemplary embodiments, and explanation will be omitted.

A different point of the fourth exemplary embodiment from the previous exemplary embodiments is firstly that the in-vehicle apparatus 10 has one application section 19 which operates on protocols of the non-IP series ASL upper level protocol section 14 and the IP series protocol section 15, and that the application section 19 has a communication protocol switching control section 195 for switching a communication protocol which is used in data communication, according to a request from the roadside apparatus 20.

The communication protocol switching control section 195 has a switching request receiving section 1951 which receives the communication protocol switching request and generates a corresponding response identifier from the request identifier, and a communication protocol switching section 1952 which switches a communication protocol to non-IP series in compliance with the switching request transmitted from the roadside apparatus, and a switching response transmitting section 1953 which transmits response data including the response identifier to the roadside apparatus 20 by non-IP series communication.

Further, a different point of the fourth exemplary embodiment from the previous exemplary embodiments is that a card reader which reads the IC card 18, the confirmation switch 191 for accepting an input from a user, and a monitor which is activated by the browser 192, are connected to the application section 19.

Figure 17:
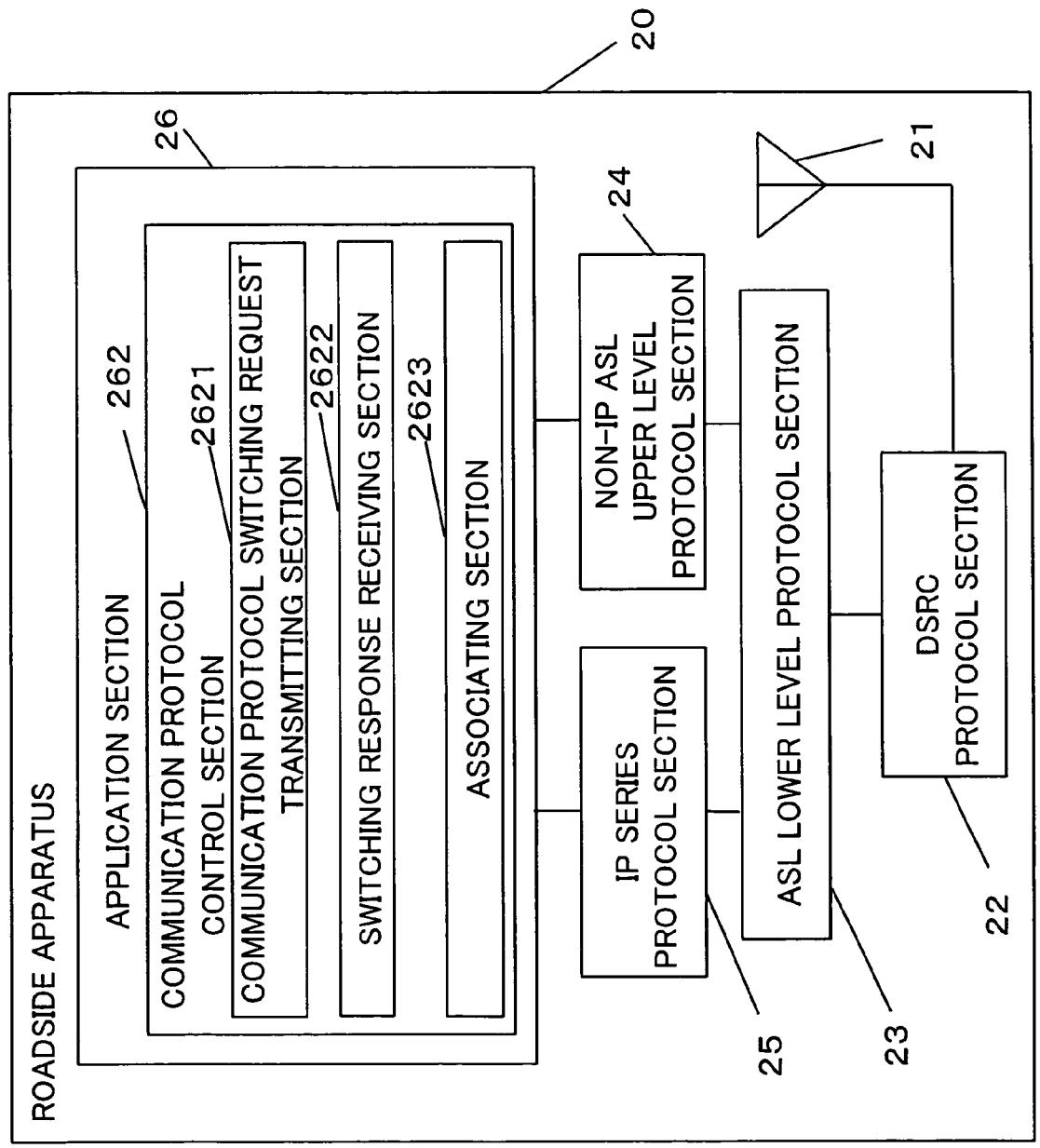
FIG. 17 is a block diagram of a roadside apparatus which configures the road-vehicle communication system in the fourth exemplary embodiment of the invention.

FIG. 17 is a block diagram which shows a roadside apparatus of the road-vehicle communication system in the forth exemplary embodiment.

In FIG. 17, same numbers are given to the same constituent elements as in the first through third exemplary embodiments, and explanation will be omitted.

A different point of the fourth exemplary embodiment from the previous exemplary embodiments is that the application section 26 has a communication protocol control section 262 for carrying out a switching request of a communication protocol which is used on the occasion of carrying out data communication with the in-vehicle apparatus 10, to the in-vehicle apparatus 10.

The communication protocol control section 262 has a communication protocol switching request transmitting section 2621 which transmits the communication protocol switching request to the in-vehicle apparatus 10 by IP series communication, a switching response receiving section 2622 which receives the response data, which was transmitted from the in-vehicle apparatus 10, by means of non-IP series communication, and an associating section 2623 which associates the response identifier included in the obtained response data with the request identifier already issued.

Figure 18:
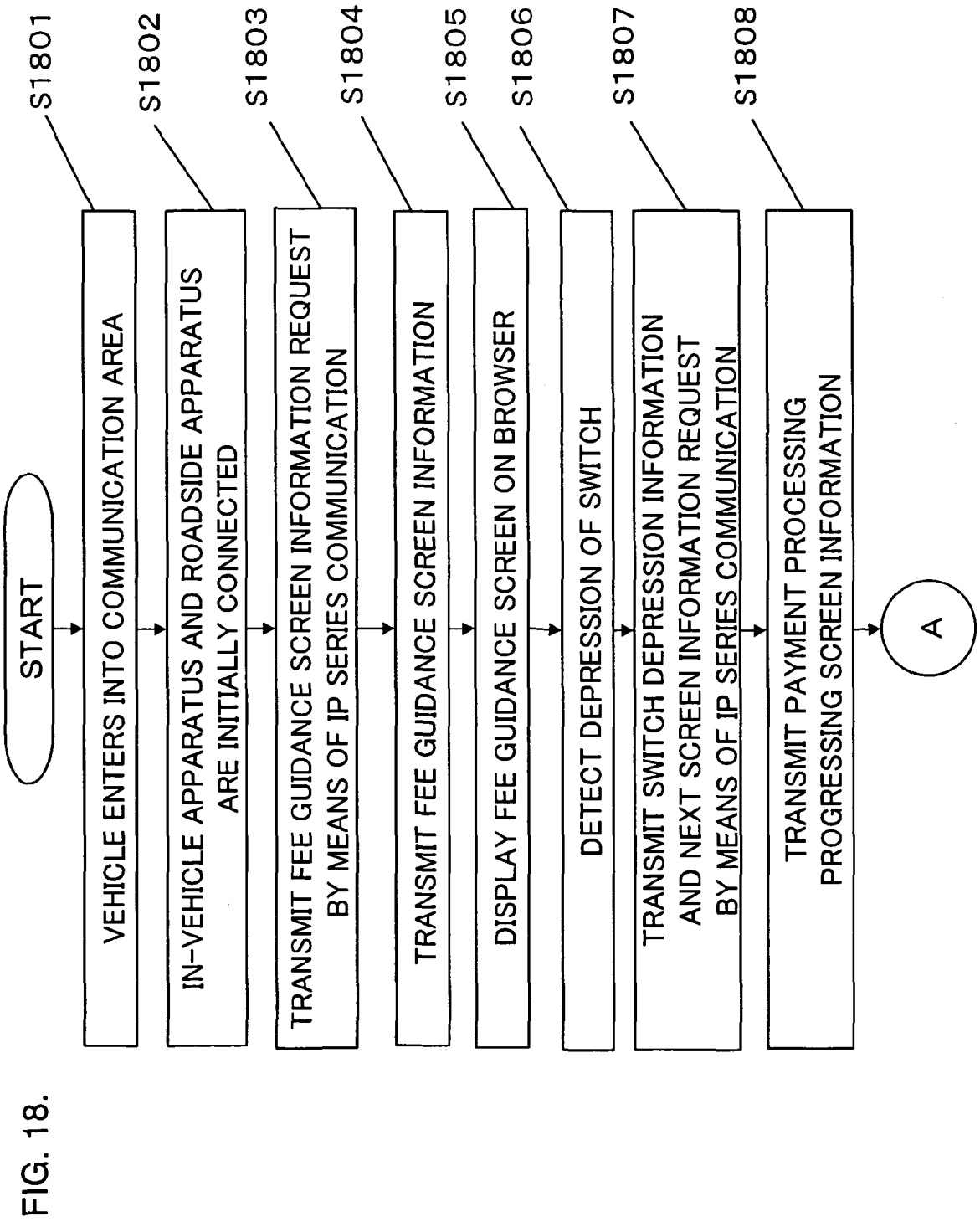
FIG. 18 is a first flow chart which represents an operation of the road-vehicle communication system in the fourth exemplary embodiment of the invention.
Figure 19:
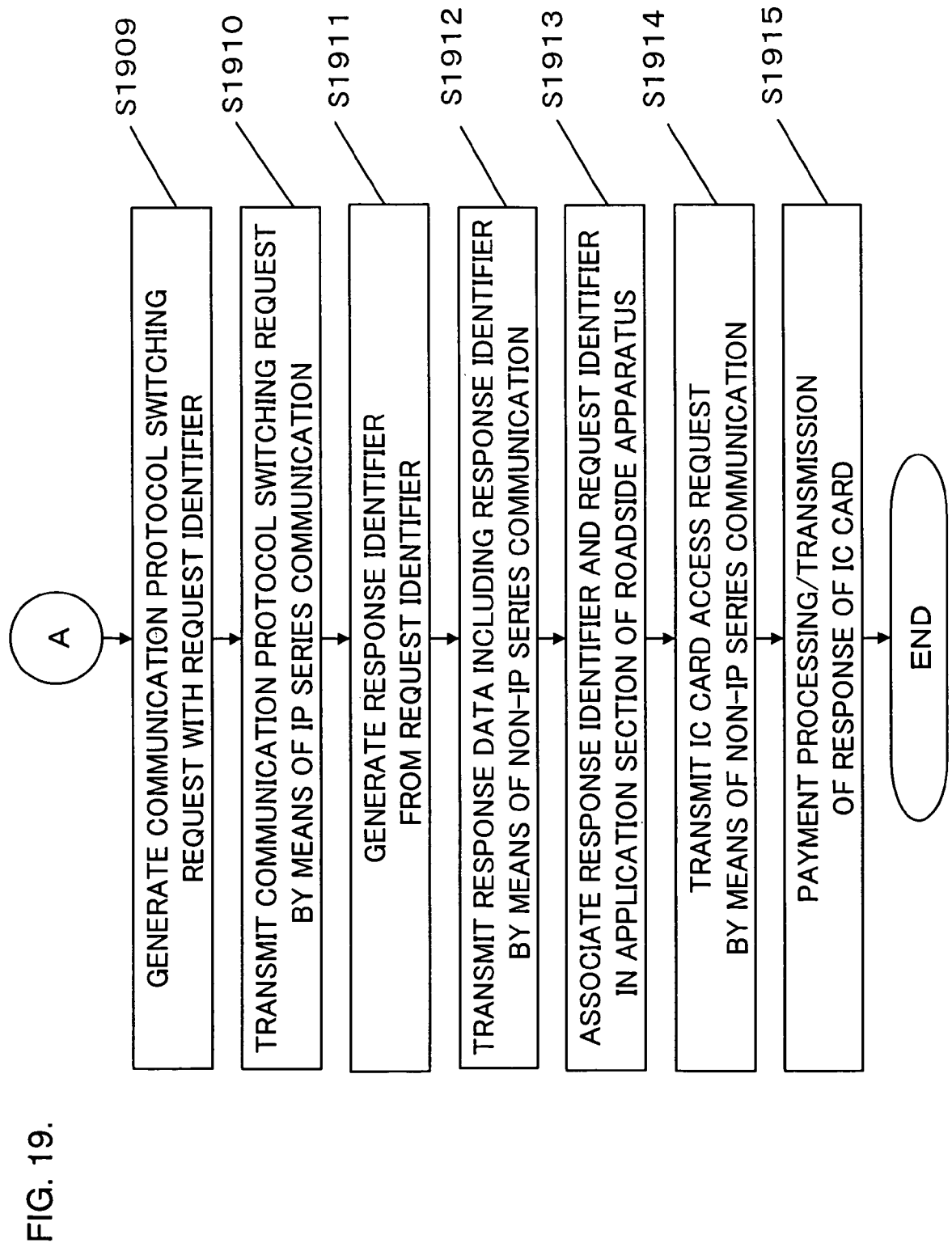
FIG. 19 is a second flow chart which represents an operation of the road-vehicle communication system in the fourth exemplary embodiment of the invention.

Next, with regard to a parking lot fee payment system which is a road-vehicle communication system in a fourth exemplary embodiment of the invention, drawing attention particularly to the time of pulling out of a parking lot, its operation will be described by use of flow charts of FIGS. 18 and 19.

When the vehicle 1, on which the in-vehicle apparatus 10 was loaded, is about to reach a pull-out gate which was disposed in a parking lot and enters into the communication area 3 which is configured by the roadside system with the roadside apparatus 20 (step S1801), the roadside apparatus 20 and the in-vehicle apparatus 10 carry out predetermined initial connection processing by DSRC and come into a communication-feasible state (step S1802).

At this time, the in-vehicle apparatus 10 notifies LID to the roadside apparatus 20 at the time of initial connection request.

In the roadside apparatus 20, a new IP address is generated in the IP series protocol section 25 according to need, and associated with LID which was obtained from the in-vehicle apparatus 10. Also, the generated IP address is notified to the in-vehicle apparatus 10, and stored in the IP series protocol section 15 for the purpose of conversion with LID of itself.

Also, an initial access URL (Uniform Resource Locator) is notified from the IP series protocol section 25 of the roadside apparatus 20 to the in-vehicle apparatus 10.

The application section 19 of the in-vehicle apparatus 10 transmits a fee guidance screen information request to the initial access URL which was notified from the application section 26 of the roadside apparatus 20 through the IP series protocol section 25 at the time of initial connection processing, by use of IP series communication (step S1803).

The application section 26 of the roadside apparatus 20 transmits fee guidance screen information including fee charge information to the vehicle 1 and payment confirmation information, in compliance with the fee guidance screen information request from the in-vehicle apparatus 10 (step S1804).

The application section 19 of the in-vehicle apparatus 10 displays a fee guidance screen by use of the browser 192 and waits for depression of the switch 191 for user confirmation (step S1805).

The application section 19 of the in-vehicle apparatus 10, when it detects the depression of the switch 191 (step S1806), transmits switch depression information and a next screen information request to the application section 26 of the roadside apparatus 20, by use of IP series communication (step S1807).

When the application section 26 of the roadside apparatus 20 transmits payment processing progressing screen information to the in-vehicle apparatus 10, in compliance with the switch depression information and the next screen information request from the in-vehicle apparatus 10 (step S1808), the application section 19 of the in-vehicle apparatus 10 displays a payment processing progressing screen by use of the browser 192.

In the communication protocol control section 262 of the roadside apparatus 20, a communication protocol switching request is generated for the purpose of carrying out non-IP series communication with the in-vehicle apparatus 10 (step S1909).

To the communication protocol switching request, a request identifier for identifying a request (e.g., time when the communication protocol switching request was generated) is given.

A communication protocol switching request transmitting section 2621 in the communication protocol control section 262 of the roadside apparatus 20 transmits the communication protocol switching request to the in-vehicle apparatus 10 by IP series communication (step S1910).

In a switching request receiving section 1951 in the communication protocol switching control section 195 of the application section 19 of the in-vehicle apparatus 10, when the communication protocol switching request is received by IP series communication, a corresponding response identifier (e.g., the same content of the request identifier) is generated from the request identifier which is included in the communication protocol switching request (step S1911).

In a communication protocol switching section 1952 in the communication protocol switching control section 195 of the application section 19 of the in-vehicle apparatus 10, a communication protocol is switched to non-IP series, in compliance with the switching request which was transmitted from the roadside apparatus 20, and response data including the above-described response identifier which was generated is transmitted from a switching response transmitting section 1953 to the roadside apparatus 20 by non-IP series communication (step S1912).

In the communication protocol control section 262 of the application section 26 of the roadside apparatus 20, the response data, which was transmitted from the in-vehicle apparatus 10, is received by a switching response receiving section 2622 by means of non-IP series communication, and in an associating section 2623, the response identifier which is included in the obtained response data and the request identifier which was already issued are associated with each other, and thereby, LID of the in-vehicle apparatus 10 which transmitted the response data is specified (step S1913).

When LID of the in-vehicle apparatus 10 is specified, the application section 26 of the roadside apparatus 20 transmits an IC card access request to the application section 19 of the in-vehicle apparatus 10 by means of non-IP series communication (step S1914).

In the application section 19 of the in-vehicle apparatus 10, predetermined payment processing is carried out to the IC card 19, and a response from the IC card 18 is transmitted to the application section 26 of the roadside apparatus 20 by means of non-IP series communication (step S1915).

When payment processing is completed, the roadside system 2 opens a vehicle entering and leaving gate.

In this manner, according to this exemplary embodiment, it is possible to realize, for example, a parking lot fee payment system by using both of IP series communication and non-IP series communication, respectively.

5. Fifth Exemplary Embodiment

Figure 20:
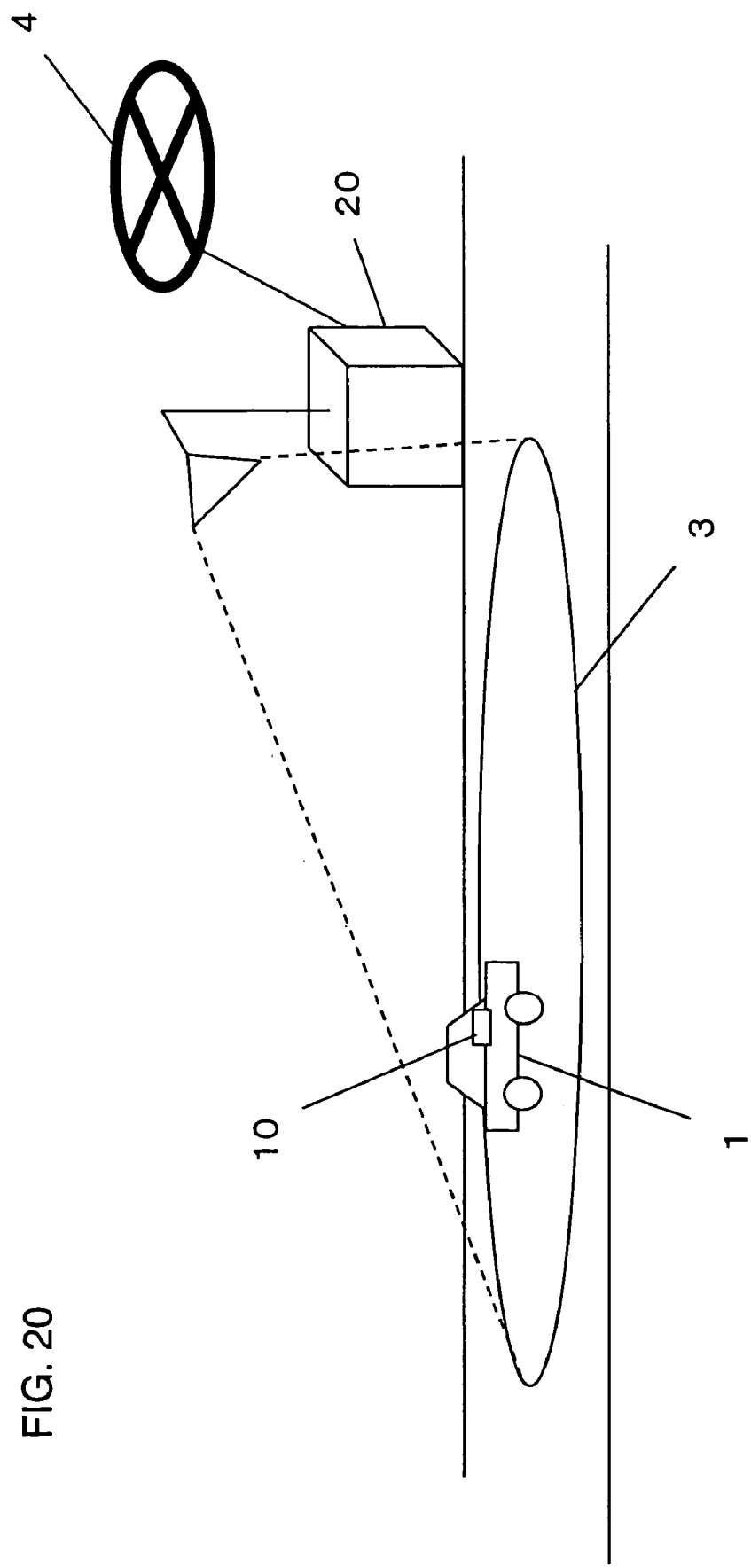
FIG. 20 is a conceptual diagram which shows a configuration of a road-vehicle communication system in a fifth exemplary embodiment of the invention.

A conceptual diagram, which represents a configuration of an electronic mail distribution system which is a road-vehicle communication system in a fifth exemplary embodiment of the invention, is shown in FIG. 20.

The fifth exemplary embodiment shown in FIG. 20 and the first exemplary embodiment shown in FIG. 1 have slightly different configurations. In FIG. 20, an identical number given shows an identical thing to the thing of the first exemplary embodiment shown in FIG. 1, and detailed explanation thereof will be omitted here, and only a different point will be described. A different point is that the roadside apparatus 20 is connected to Internet 4.

Figure 21:
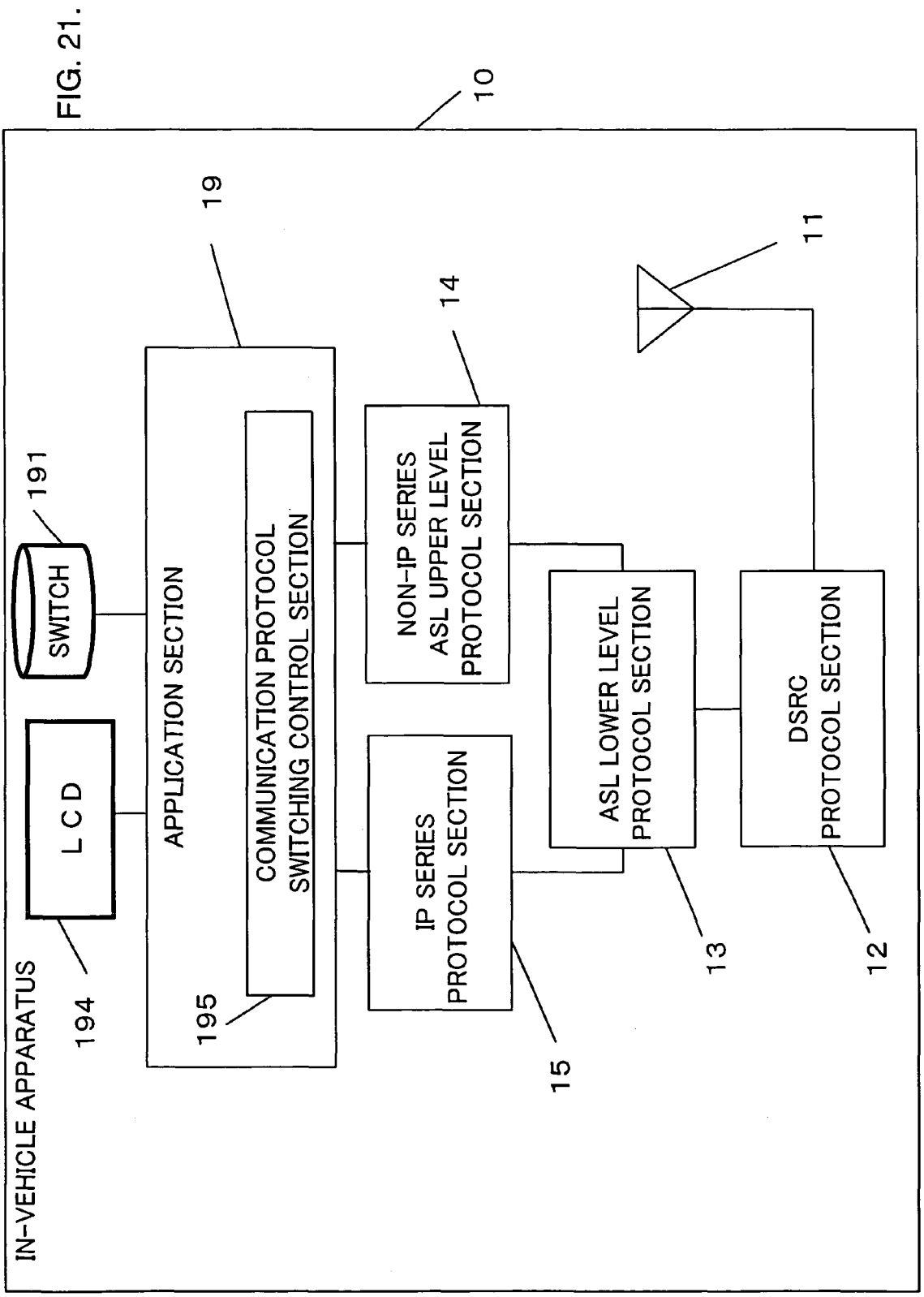
FIG. 21 is a block diagram of an in-vehicle apparatus which configures the road-vehicle communication system in the fifth exemplary embodiment of the invention.

FIG. 21 is a block diagram of the in-vehicle apparatus 10 of the road-vehicle communication system in the fifth exemplary embodiment, and same numbers are given to the same constituent elements as those in the fourth exemplary embodiment, and explanation will be omitted.

A different point of the fifth exemplary embodiment and the fourth exemplary embodiment is that the confirmation switch 191 and a liquid crystal display section (LCD) 194 were connected to the application section 19 which configures the in-vehicle apparatus 10.

Figure 22:
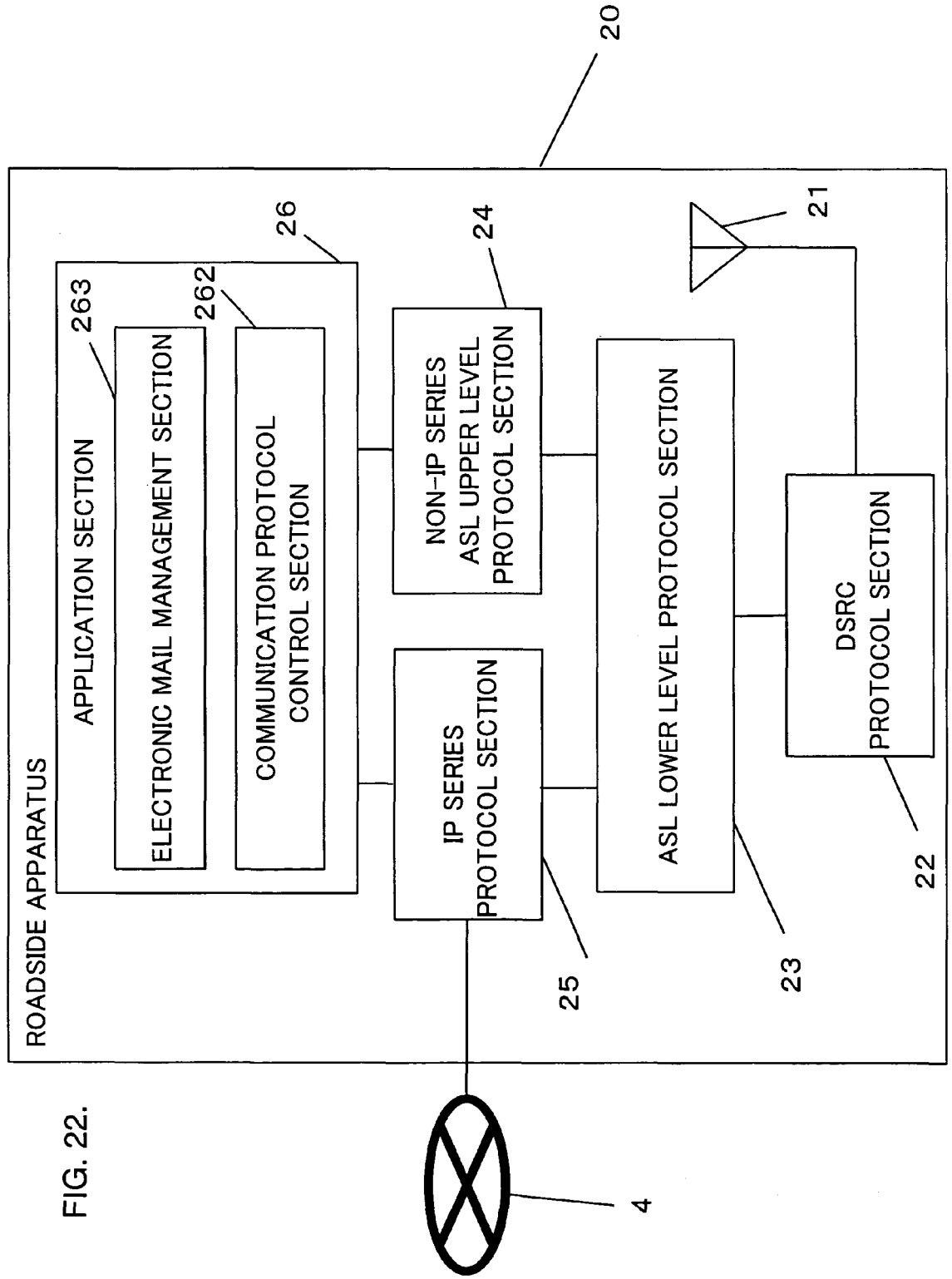
FIG. 22 is a block diagram of a roadside apparatus which configures the road-vehicle communication system in the fifth exemplary embodiment of the invention.

FIG. 22 is a block diagram of the roadside apparatus 20 of the road-vehicle communication system in the fifth exemplary embodiment, and same numbers are given to the same constituent elements as those in the fourth exemplary embodiment shown in FIG. 17, and explanation will be omitted.

A different point of the fifth exemplary embodiment and the fourth exemplary embodiment is that the roadside apparatus 20 is connected to Internet 4, and the application section 26 of the roadside apparatus 20 has an electronic mail management section 263 which obtains and saves electronic mails sent to a mail address of a user who owns the in-vehicle apparatus 10 and was registered in advance, through Internet 4, and transmits it to the in-vehicle apparatus 10.

Figure 23:
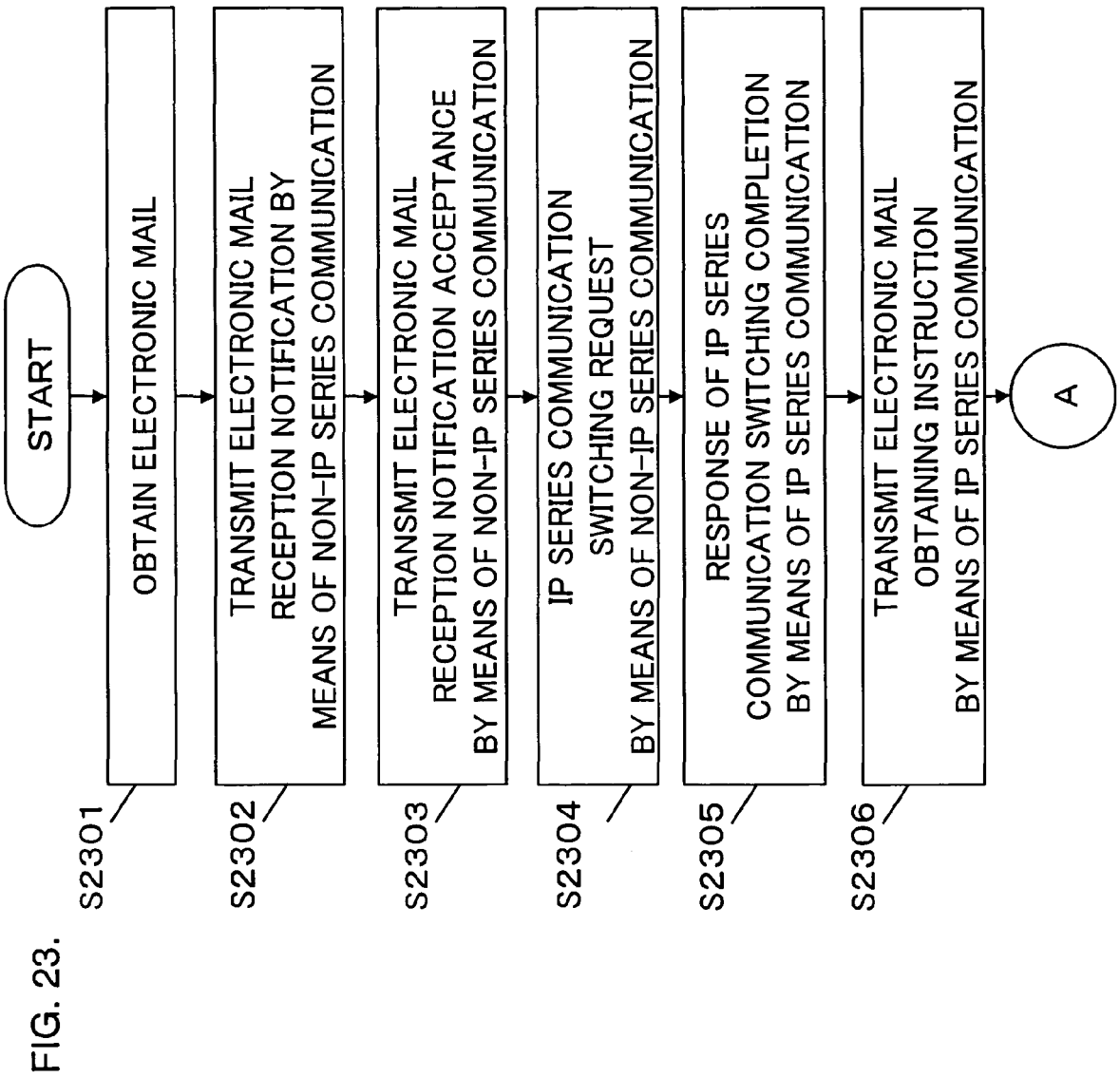
FIG. 23 is a first flow chart which represents an operation of the road-vehicle communication system in the fifth exemplary embodiment of the invention.
Figure 24:
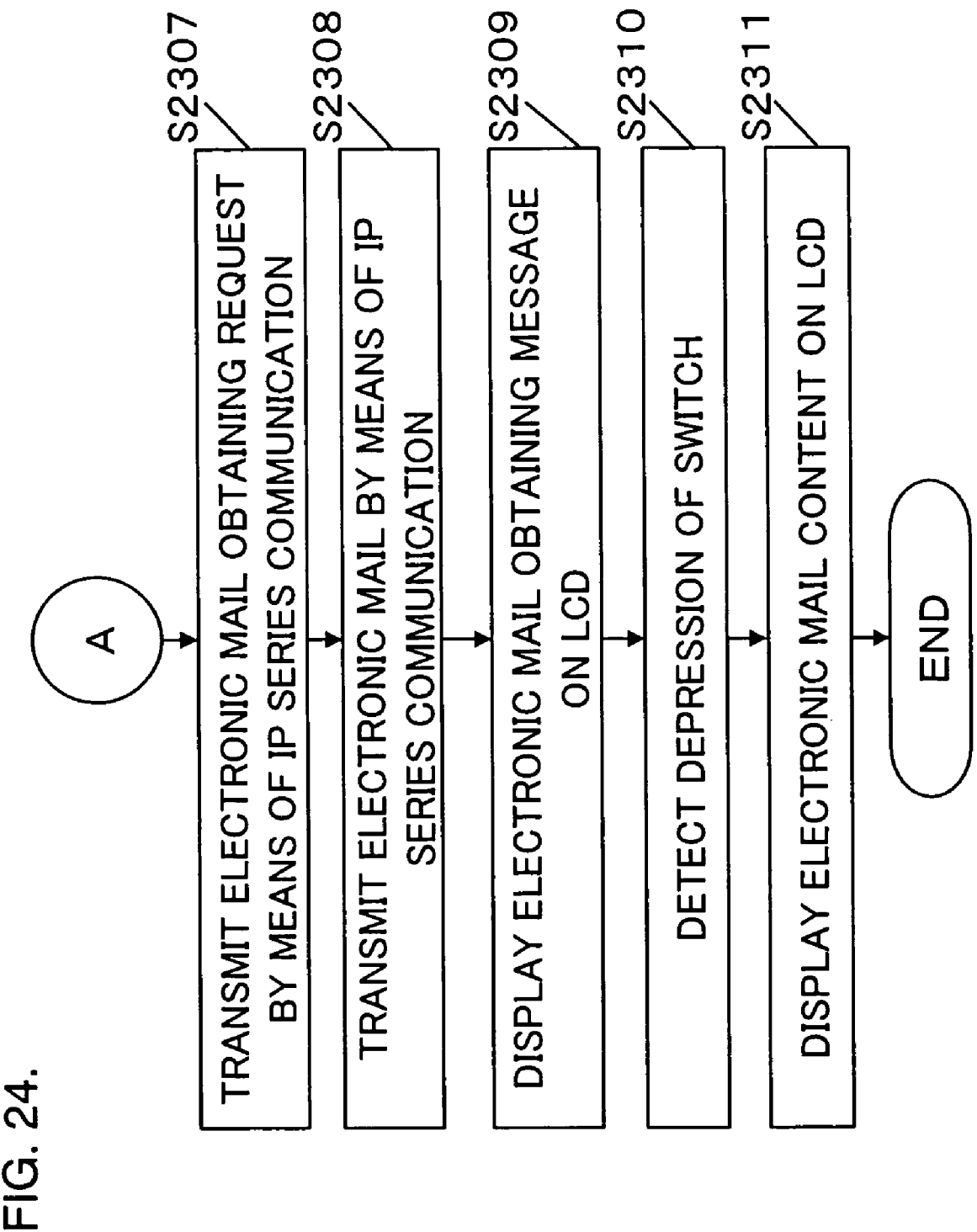
FIG. 24 is a second flow chart which represents an operation of the road-vehicle communication system in the fifth exemplary embodiment of the invention.

Next, with regard to the electronic mail distribution system in the fifth exemplary embodiment of the invention, its operation will be described by use of flow charts of FIGS. 23 and 24.

The electronic mail management section 263 of the application section 26 of the roadside apparatus 20 obtains an electronic mail which was sent to a mail address registered in advance, of a user who owns the in-vehicle apparatus 10, through Internet 4 (step S2301).

The electronic mail management section 263, when it obtains an electronic mail, transmits an electronic mail reception notification to the in-vehicle apparatus 10 which an owner of the mail address owns, by means of non-IP series communication (step S2302).

The application section 19 of the in-vehicle apparatus 10, when it receives the electronic mail reception notification, responds to the roadside apparatus 20 as to acceptance of the electronic mail reception notification, by means of non-IP series communication (step S2303).

The electronic mail management section 263 of the application section 26 of the roadside apparatus 20, when it receives an acceptance response of the electronic mail reception notification from the in-vehicle apparatus 10, carries out a switching request to IP series communication, to the in-vehicle apparatus 10, so as to enable IP series communication, by means of non-IP series communication (step S2304).

The application section 19 of the in-vehicle apparatus 10, when it receives the switching request to IP series communication, carries out a response of switching completion to IP series communication, to the roadside apparatus 20, by means of IP series communication (step S2305).

The electronic mail management section 263 of the application section 26 of the roadside apparatus 20, when it receives the response of switching completion to IP series communication, from the in-vehicle apparatus 10, carries out an electronic mail obtaining instruction to the in-vehicle apparatus 10, so as to obtain an electronic mail, by means of IP series communication (step S2306).

The application section 19 of the in-vehicle apparatus 10, when it receives the electronic mail obtaining instruction, transmits an electronic mail obtaining request, to the roadside apparatus 20, by means of IP series communication (step S2307).

The electronic mail management section 263 of the application section 26 of the roadside apparatus 20, when it receives the electronic mail obtaining request from the in-vehicle apparatus 10, transmits an electronic mail which was transmitted to the mail address of a user who owns the in-vehicle apparatus 10, by means of IP series communication (step S2308).

The application section 19 of the in-vehicle apparatus 10, when it obtains an electronic mail, displays an obtaining message for notifying that an electronic mail was obtained, on LCD 194, and waits for confirmation of a user by depression of the switch 191 as to whether a content of the obtained electronic mail is displayed (step S2309).

The application section 19 of the in-vehicle apparatus 10, when it detects switch depression (step S2310), displays the obtained electronic mail on LCD 194 (step S2311).

In this manner, according to this exemplary embodiment, it is possible to realize, for example, the electronic mail distribution system by using both of IP series and non-IP series communication, respectively.

Meanwhile, in FIGS. 16 and 21, each of the application section 19, the IP series protocol section 15, the non-IP series ASL upper level protocol section 14 and the ASL lower level protocol section 13 is configured in the same in-vehicle apparatus 10, but it may be all right even if it is configured in such a manner that at least one of these things is disposed in an apparatus which is outside the in-vehicle apparatus 10, and can communicate with the in-vehicle apparatus 10 with wire communication or wireless communication.

In FIGS. 17 and 22, each of the application section 26, the IP series protocol section 25, the non-IP series ASL upper level protocol section 24 and the ASL lower level protocol section 23 is configured in the same roadside apparatus 20, but it may be all right even if it is configured in such a manner that at least one of these things is disposed in an apparatus which is outside the roadside apparatus 20, and can communicate with the roadside apparatus 20 with wire communication or wireless communication.

Also, in FIGS. 16 and 21, it may be all right even if it is configured in such a manner that the application section 19 is divided into a plurality of pieces.

Further, in FIGS. 17 and 22, it may be all right even if it is configured in such a manner that the application section 26 is divided into a plurality of pieces.

Also, in the fifth exemplary embodiment, as the request identifier, time when the roadside apparatus generated the communication protocol switching request was described as an example, and as the response identifier, the case of the same content as the request identifier was described as an example, but if the roadside apparatus can discriminate a relevant request identifier by the response identifier, the request identifier may be time when the roadside apparatus transmitted the communication protocol switching request, a sequential number that the roadside apparatus gave to transmission of the communication protocol switching request, or a management number that the roadside apparatus gave to an in-vehicle apparatus which is present in a communication area of itself.

Further, in case that the first communication protocol is a IP series communication protocol and the second communication protocol is a non-IP series communication protocol, it may be all right even if the request identifier does not exist or is an IP address, and the response identifier is set to an IP address, and adversely, in case that the first communication protocol is a non-IP series communication protocol and the second communication protocol is a IP series communication protocol, it may be all right even if the request identifier does not exist or is LID, and the response identifier is set to LID.

As above, according to the fourth and fifth exemplary embodiments, the in-vehicle apparatus issues a switching request to the second communication protocol by the first communication protocol, and the in-vehicle apparatus switches a communication protocol to the second communication protocol in compliance with the switching request and transmits the switching response, and the roadside apparatus receives the switching response and associates it with the switching response, and thereby, the roadside apparatus specifies an arbitrary in-vehicle apparatus on a plurality of communication protocols, and it becomes possible to switch and use a plurality of communication protocols according to need.

As described above, according to this invention, it has an advantage that it is possible to provide a road-vehicle communication system which can be utilized with concomitantly using both of for example, an IP series communication protocol for specifying an in-vehicle apparatus by an IP address which was assigned to the in-vehicle apparatus, and an non-IP series communication protocol for specifying an in-vehicle apparatus by use of LID.

What is claimed is:

1. A roadside apparatus for use in a road-vehicle communication system, comprising
a communication unit for carrying out communication with a mobile apparatus without wires, by use of an IP based communication protocol and a non-IP based communication protocol, wherein the communication unit transmits the IP based communication protocol and the non-IP based communication protocol using a common transmission method;

an IP series protocol section for generating a first identifying information for identifying the mobile apparatus in the IP based communication protocol in response to receiving a second identifying information from the mobile apparatus for identifying the mobile apparatus in the non-IP based communication protocol, and for associating the first identifying information and the second identifying information with the mobile apparatus, wherein the roadside apparatus transmits the first identifying information to the mobile apparatus; and an application section for performing a series of processes using both an IP based communication and a non-IP based communication, by switching between a first process using the IP based communication protocol and a second process using the non-IP based communication protocol, wherein the application section further comprises a specifying unit for retaining associated information of the first identifying information and the second identifying information, and specifying the mobile apparatus in the first process and the second process by the associated information, and wherein the application section performs the series of processes using both the IP based communication and the non-IP based communication during communication with the mobile apparatus specified by the specifying unit, by switching between the first process and the second process.

2. The roadside apparatus as set forth in claim 1, wherein the specifying unit receives the first identifying information and the second identifying information which are notified from the mobile apparatus, respectively, and the specifying unit associates the first identifying information with the second identifying information to store the first identifying information and second identifying information.

3. The roadside apparatus as set forth in claim 1, wherein the IP protocol section associates the first identifying information with the second identifying information prior to the first process, and the specifying unit obtains the first identifying information and the second identifying information from information associated by the IP series protocol section and associates the first identifying information with the second identifying information to store the first identifying information and second identifying information.

4. A roadside apparatus for use in a road-vehicle communication system, comprising:

a communication unit for carrying out communication with a mobile apparatus without wires, by use of an IP based communication protocol and a non-IP based communication protocol, wherein the communication unit transmits the IP based communication protocol and the non-IP based communication protocol using a common transmission method;

an IP series protocol section for generating a first identifying information for identifying the mobile apparatus in the IP based communication protocol in response to receiving a second identifying information from the mobile apparatus for identifying the mobile apparatus in the non-IP based communication protocol, and for associating the first identifying information and the second identifying information with the mobile apparatus, wherein the roadside apparatus transmits the first identifying information to the mobile apparatus; and an application section for performing a series of processes using both an IP based communication and a non-IP based communication, by switching between a first process using the IP based communication protocol and a second process using the non-IP based communication protocol, the application section comprising:

a switching request issuing unit for issuing a switching request for switching to the non-IP based communication protocol or the IP based communication protocol, to the mobile apparatus by use of the IP based communication protocol or the non-IP based communication protocol;

a switching response receiving unit for receiving a switching response to the switching request, by use of the non-IP based communication protocol or the IP based communication protocol, from the mobile apparatus; and a specifying unit for associating the switching request issued by the switching request issuing unit with the switching response received by the switching response receiving unit, and specifying the mobile apparatus in a first process using the IP based communication protocol and a second process using the non-IP based communication protocol, wherein the application section performs the series of processes using both the IP based communication and the non-IP based communication during communication with the mobile apparatus specified by the specifying unit, by switching between the first process and the second process.

5. The roadside apparatus as set forth in claim 4, wherein the switching request includes a request identifier for identifying the switching request, and the switching response includes a response identifier which corresponds to the request identifier.

6. A mobile apparatus for use in a road-vehicle communication system, comprising:

a communication unit for carrying out communication with a roadside apparatus without wires, by use of an IP based communication protocol and a non-IP based communication protocol, wherein the communication unit transmits the IP based communication protocol and the non-IP based communication protocol using a common transmission method;

a notifying unit for transmitting a second identifying information for identifying the mobile apparatus in the non-IP based communication protocol to the roadside apparatus, wherein in response to transmitting the second identifying information, the mobile apparatus receives a first identifying information generated by the roadside apparatus for identifying the mobile apparatus in the IP based communication protocol, the first identifying information and second identifying information being associated with the mobile apparatus; and an application section for performing a series of processes using both an IP based communication and non-IP based communication, by switching between a first process using the IP based communication protocol and a second process using the non-IP based communication protocol, wherein the application section performs the series of processes using both the IP based communication and the non-IP based communication during communication with the roadside apparatus based on the associated first identifying information and second identifying information, by switching between the first process and the second process.

7. The mobile apparatus as set forth in claim 6, wherein the notifying unit notifies the first identifying information to the roadside apparatus by the non-IP based communication protocol.

8. The mobile apparatus as set forth in claim 6, wherein the notifying unit notifies the second identifying information to the roadside apparatus by the IP based communication protocol.

9. A mobile apparatus for use in a road-vehicle communication system, comprising:
  a communication unit for carrying out communication with a roadside apparatus without wires, by use of an IP based communication protocol and a non-IP based communication protocol, wherein the communication unit transmits the IP based communication protocol and the non-IP based communication protocol using a common transmission method;
  a notifying unit for transmitting to a roadside apparatus, a second identifying information for identifying the mobile apparatus in the non-IP based communication protocol,
  wherein in response to transmitting the second identifying information, the mobile apparatus receives from the roadside apparatus, a first identifying information generated by the roadside apparatus for identifying the mobile apparatus in the IP based communication protocol;
  an IP series protocol section for associating the first identifying information for identifying the mobile apparatus in the IP based communication protocol with the second identifying information for identifying the mobile apparatus in the non-IP based communication protocol; and
  an application section for performing a series of processes using both an IP based communication and a non-IP based communication, by switching between a first process using the IP based communication protocol and a second process using the non-IP based communication protocol,
  the application section comprising:
  a switching request receiving unit for receiving a switching request to the non-IP based communication protocol or the IP based communication protocol, by use of the IP based communication protocol or the non-IP based communication protocol;
  a switching unit for switching a communication protocol using for the communication to the non-IP based communication protocol or the IP based communication protocol, in response to the switching request received by the switching request receiving unit; and
  a switching response transmitting unit for transmitting a switching response to the switching request by use of the non-IP based communication protocol or the IP based communication protocol,
  wherein the application section performs the series of processes using both the IP based communication and non-IP based communication during communication with the roadside apparatus specifying the mobile apparatus by associating switching request received by the switching request receiving unit with the switching response transmitted by the switching response transmitting unit, by switching between the first process and the second process.

10. The mobile apparatus as set forth in claim 9, the switching request includes a request identifier for identifying the switching request, and the switching response includes a response identifier which corresponds to the request identifier.

11. A road-vehicle communication method using a roadside apparatus for carrying out communication with a mobile apparatus without wires by use of an IP based communication protocol and a non-IP based communication protocol and the mobile apparatus for carrying out communication with the roadside apparatus without wires, by use of communication protocols including the IP based communication protocol and the non-IP based communication protocol, the method comprising:
  transmitting, from the mobile apparatus to the roadside apparatus, a second identifying information for identifying the mobile apparatus in the non-IP based communication protocol;
  generating, by the roadside apparatus, a first identifying information for identifying the mobile apparatus in the IP based communication protocol, in response to receiving the second identifying information;
  associating, by the roadside apparatus, the first identifying information and second identifying information with the mobile apparatus;
  transmitting, from the roadside apparatus to the mobile apparatus, the first identifying information; and
  performing, by the roadside apparatus, a series of processes using both an IP based communication and a non-IP based communication, by switching between a first process using the IP based communication protocol and a second process using the non-IP based communication protocol, wherein the IP based communication protocol and the non-IP based communication protocol are transmitted using a common transmission method,
  wherein the performing step further comprises:
  retaining associated information of the first identifying information and the second identifying information; and
  specifying the mobile apparatus in the first process and the second process by the associated information, and
  wherein the performing step performs the series of processes using both the IP based communication and the non-IP based communication during communication with the mobile apparatus specified by the specifying step, by switching between the first process and the second process.

* * * * *